(12) United States Patent
Sachdeva et al.

(10) Patent No.: US 11,695,723 B2
(45) Date of Patent: Jul. 4, 2023

(54) CREATION AND CONSUMPTION OF NON-ELECTRONIC MAIL (EMAIL) SOCIAL MEDIA CONTENT FROM WITHIN AN EMAIL SYSTEM

(71) Applicant: Microsoft Technology Licensing, LLC, Redmond, WA (US)

(72) Inventors: Ravin Sachdeva, Seattle, WA (US); Amy Huyen Phuoc Nguyen, Bellevue, WA (US); Anne O'Neill, Seattle, WA (US); Garett Yoshiharu Sakamoto, Newcastle, WA (US); Luiz Gustavo Bustamante Magalhaes, Kirkland, WA (US); Giovannah Lizette Webb, Clayton, WA (US); Gustavo Santos, Redmond, WA (US); Haroon Dawood Barri, Bothell, WA (US); Dianne Patricia Lobo, Redmond, WA (US); Tricia Lybrook, Redmond, WA (US); Humberto Lezama Guadarrama, Redmond, WA (US); Izis de Melo Moreira, Kirkland, WA (US); Charles Scott Walker, Sammamish, WA (US); Suzanne Tocco, Kirkland, WA (US); Christopher Andrews Jung, Seattle, WA (US); Vanessa Harris, Corpus Christi, TX (US); Daniel F. Holme, Phoenix, AZ (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/514,554

(22) Filed: Oct. 29, 2021

(65) Prior Publication Data
US 2023/0134691 A1 May 4, 2023

(51) Int. Cl.
*H04L 51/42* (2022.01)
*G06F 9/54* (2006.01)
(Continued)

(52) U.S. Cl.
CPC .............. *H04L 51/42* (2022.05); *G06F 9/547* (2013.01); *H04L 51/08* (2013.01); *H04L 51/52* (2022.05); *H04L 63/08* (2013.01)

(58) Field of Classification Search
CPC ....... H04L 51/216; H04L 51/52; H04L 51/56; H04L 51/42; H04L 51/08; H04L 12/1818; H04L 63/08; G06F 9/547
See application file for complete search history.

(56) References Cited

U.S. PATENT DOCUMENTS 8,583,738 B2  11/2013  Zuckerberg et al.
9,043,405 B2  5/2015  Ly et al.
(Continued)

OTHER PUBLICATIONS

"Non Final Office Action Issued in U.S. Appl. No. 17/072,489". dated Feb. 10, 2022, 26 Pages.
(Continued)

*Primary Examiner* — Jungwon Chang
(74) *Attorney, Agent, or Firm* — Christopher J. Volkmann; Kelly, Holt & Christenson PLLC

(57) ABSTRACT

An email system detects a user interaction to interact with a social media application, within the email system. The email system accesses a social media component that renders a user interface from the social media system and detects interactions with the user interface to generate content for the social media application. The social media component calls the social media application, with the content, and provides a response indicating that the content has been sent to the social media application.

20 Claims, 26 Drawing Sheets

(51) Int. Cl.
*H04L 9/40* (2022.01)
*H04L 51/08* (2022.01)
*H04L 51/52* (2022.01)

(56) References Cited

U.S. PATENT DOCUMENTS

| | | | |
|---|---|---|---|
| 9,252,973 B1* | 2/2016 | Lin | H04L 51/52 |
| 9,471,899 B2 | 10/2016 | Beyer et al. | |
| 9,754,326 B2 | 9/2017 | Franco et al. | |
| 9,929,999 B2* | 3/2018 | Allen | H04L 51/56 |
| 9,935,912 B2* | 4/2018 | Allen | H04L 51/56 |
| 10,122,791 B2 | 11/2018 | Smarr et al. | |
| 10,701,022 B2 | 6/2020 | Carter et al. | |
| 2007/0157104 A1 | 7/2007 | Blain et al. | |
| 2008/0189622 A1 | 8/2008 | Sanchez et al. | |
| 2011/0196933 A1* | 8/2011 | Jackson | H04L 51/216 |
| | | | 709/206 |
| 2013/0132864 A1 | 5/2013 | Panigrahi et al. | |
| 2013/0204952 A1* | 8/2013 | Everton | H04L 51/216 |
| | | | 709/206 |
| 2013/0219296 A1 | 8/2013 | Thazhmon et al. | |
| 2013/0326362 A1 | 12/2013 | Murray et al. | |
| 2013/0332849 A1 | 12/2013 | Santos | |
| 2014/0006977 A1* | 1/2014 | Adams | H04L 12/1818 |
| | | | 715/753 |
| 2015/0212984 A1 | 7/2015 | Bowden | |
| 2016/0344679 A1 | 11/2016 | Jhawar et al. | |
| 2017/0104785 A1 | 4/2017 | Stolfo et al. | |
| 2018/0004373 A1 | 1/2018 | Peacock et al. | |
| 2018/0091458 A1 | 3/2018 | Goyal et al. | |
| 2018/0152412 A1* | 5/2018 | Carter | H04L 51/52 |
| 2018/0337873 A1* | 11/2018 | Clark | H04L 51/52 |
| 2019/0012669 A1 | 1/2019 | Pearson et al. | |
| 2020/0366628 A1 | 11/2020 | Olivera et al. | |
| 2022/0124061 A1 | 4/2022 | Sachdeva et al. | |

OTHER PUBLICATIONS

"Work with Yammer from Outlook", Retrieved From: https://support.microsoft.com/en-us/office/work-with-yammer-from-outlook-fd695485-225b-410f-b24a-17f971b46b25, Retrieved Date: Aug. 25, 2020, 4 Pages.

Fischer, et al., "Email Clients as Decentralized Social Apps in Mr. Privacy", Retrieved From: https://mobisocial.stanford.edu/papers/hotpets11.pdf, 2011, 10 Pages.

George, Kevin, "Social Media Live Feeds in Email: How to Get Results That Wow", Retrieved From: https://www.sendible.com/insights/social-media-live-feeds-in-emails, Jun. 20, 2017, 15 Pages.

Kelbe, Kevin, "How to Post Your Emails to Social Media", Retrieved From: https://web.archive.org/web/20181102021849/http:/blog.clickdimensions.com/how-to-post-your-emails-to-social-media/, Nov. 2, 2018, 3 Pages.

"Notice of Allowance Issued in U.S. Appl. No. 17/072,489", dated May 23, 2022, 8 Pages.

U.S. Appl. No. 17/072,489, filed Oct. 16, 2020.

"International Search Report and Written Opinion Issued in PCT Application No. PCT/US22/041618", dated Nov. 24, 2022, 11 Pages.

* cited by examiner

CREATION AND CONSUMPTION OF NON-ELECTRONIC MAIL (EMAIL) SOCIAL MEDIA CONTENT FROM WITHIN AN EMAIL SYSTEM

BACKGROUND

Computer systems are currently in wide use. Some computer systems host services in a remote server environment.

For example, social media systems host social media applications in a remote server architecture. Users can access the social media application with user devices, through a network, such as a wide area network. Some social media services include user device components which run on the user devices and are used to access the social media application in the remote server architecture. Similarly, some components of the social media application can also run in a browser or can be accessed in other ways.

Electronic mail (email) systems can be run in a remote server architecture and accessed by users using user devices. Components of an email service can also run in a browser or in other ways on a user device, or the email system can be distributed in other ways.

The discussion above is merely provided for general background information and is not intended to be used as an aid in determining the scope of the claimed subject matter.

SUMMARY

An email system detects a user interaction to interact with a social media application, from within the email system. The email system initializes a social media component that renders a user interface from the social media system and detects interactions with the user interface to generate content for the social media application. The social media component calls the social media application, with the content, and generates a response output indicating that the content has been sent to the social media application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are many types of social media applications that may be hosted or otherwise accessed by users. Similarly, email systems can be hosted and accessed by users in various ways. In order for an email user to access social media content, or to post social media content, the user often needs to navigate away from the email application and open or other wise access the social media application. Similarly, in order to view content posted by another user on the social media application, the email user must do the same thing—navigate away from the email application and open or otherwise access the social media application. This can be cumbersome and it can inhibit users from communicating with one another in ways that may be beneficial to an organization. It can also waste a user's time and distract the user when navigating between the two systems.

The present discussion thus proceeds with respect to an email system that uses social media components that allow users to generate content and post that content to a social media application from within the email system. The email system can also us the social media components to receive and consume social media information from the social media application, and present that information to users within the email system allowing the users to interact with the social media content.

Figure 1:
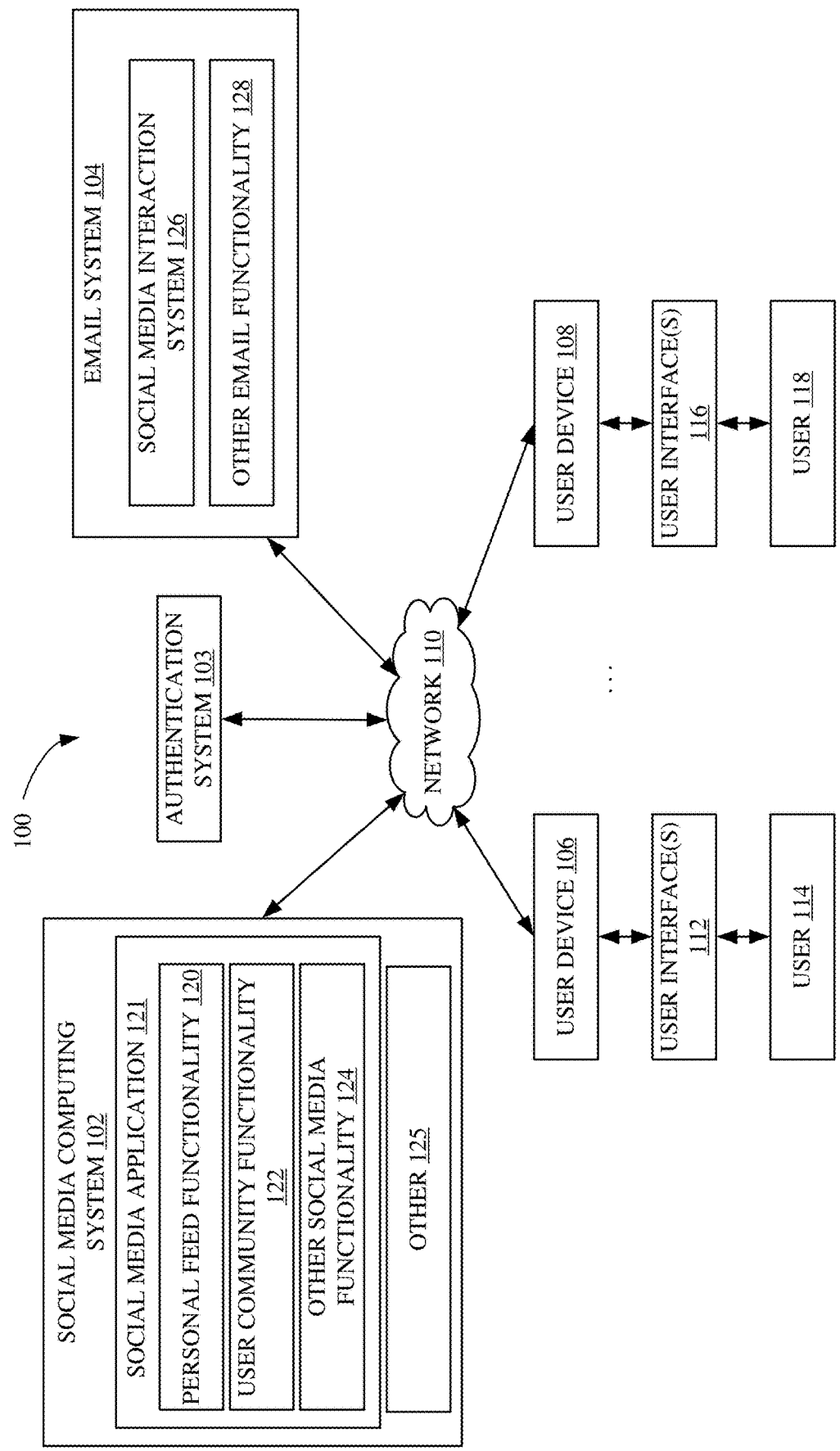
FIG. 1 is a block diagram of one example of a computing system architecture.

FIG. 1 is a block diagram of one example of a computing system architecture 100 which includes a social media computing system 102, authentication system 103, and an email system 104, which are accessible by a plurality of different user devices 106-108 over a network 110. Network 110 can thus be a wide area network, a local area network, a near field communication network, a cellular communication network, or any of a wide variety of other networks or combinations of networks. User devices 106-108 can be a wide variety of different types of user devices, some of which are described below. User device 106 is shown generating user interfaces 112 for interaction by user 114. User 114 interacts with user interfaces 112 in order to control and manipulate device 106 and some portions of social media computing system 102 and email system 104. User device 108 is shown generating user interfaces 116 for interaction by user 118. User 118 interacts with user interfaces 116 in order to control and manipulate user device 108 and some portions of social media computing system 102 and email system 104.

FIG. 1 shows that social media computing system 102 includes functionality for running social media application 121 and other items 125. Social media application 121 can include personal feed functionality 120, user community functionality 122, and a wide variety of other social media functionality 124. Email system 104 illustratively includes social media interaction system 126 and a wide variety of other email functionality 128. Prior to describing the overall operation of architecture 100, a description of some of the items in architecture 100, and their operation, will first be described.

Social media application 121 can be any of a wide variety of different types of social media applications. The social media application 121 can use community functionality 122 which allows users 114-118 to associate with one another and other users, and to join various communities or groups. Users can use personal feed functionality 120 to maintain a personal feed which can be accessed by other users. The personal feeds and community feeds can be propagated to various groups. Therefore, personal feed functionality 120 allows users to generate content for a personal social media feed where messages and content on that feed can be propagated to other users. The content can be textual content, audio content, video content, or other content. User community functionality 122 allows users to join communities or groups and to propagate content from the various users to the community or group. Users can interact with content on a social media feed such as by replying to it, liking it, commenting on it, forwarding it, etc. Social media computing system 102 can include a wide variety of other social media functionality 124 as well.

Social media interaction system 126 illustratively downloads social media components from social media computing system 102 which can be rendered to a user within email system 104. The rendered components allow the users to generate content for posting or otherwise submitting content to the social media application 121 in computing system 102. When the content is input, social media interaction system 126 provides the content and other inputs from the user to run in the functionality of social media computing system 102. When other users interact with content posted to social media application 121 in computing system 102, system 102 can generate a notification email through social media interaction system 126 notifying relevant users of the interaction with the content posted to the social media application 121.

This allows users to interact with social media computing system 102 using social media components from within email system 104, and without navigating away from email system 104.

Other email functionality 128 allows users to author, send, and receive emails. The other email functionality 128 can allow users to perform other email functions as well.

When other users interact with content posted to social media application 121 in computing system 102, system 102 can generate a notification email through social media interaction system 126 notifying relevant users of the interaction with the content posted to the social media application 121.

Authentication system 103 can be a token-based authentication system or another type of authentication system. Email system 104 can use authentication system 103 to authenticate a user to social media application 121.

Figure 2:
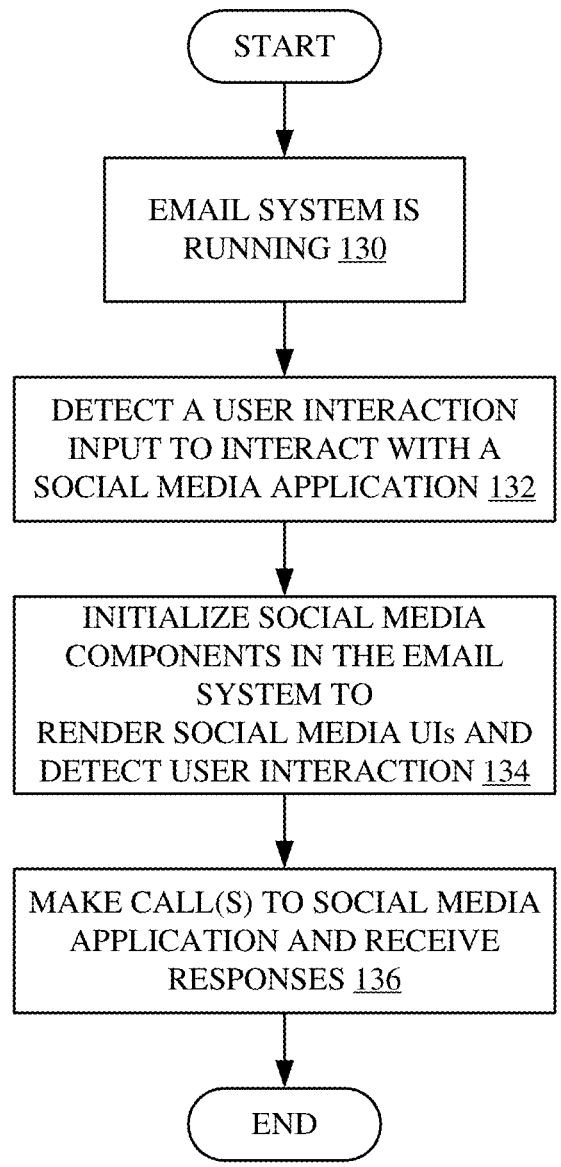
FIG. 2 is a flow diagram illustrating one example of the operation of a computing system architecture.

FIG. 2 is a flow diagram illustrating one example of the overall operation of computing system architecture 100. It is assumed that email system 104 is running, as indicated by block 130 in the flow diagram of FIG. 2. Social media interaction system 126 then detects a user interaction indicating that the user wishes to interact with social media application 121 running on social media computing system 102. Detecting the user interaction input is indicated by block 132 in the flow diagram of FIG. 2. Social media interaction system 126 then initializes social media components that are used to render a social media user interface (UI) which it has loaded from social media computing system 102 into a library, and detects user interactions with those UIs with the rendered UI. Rendering the social media UIs and detecting user interaction is indicated by block 134 in the flow diagram of FIG. 2.

Social media interaction system 126 then makes calls to social media application 121 running on social media computing system 102 and receives responses. Thus, the inputs received on the UIs rendered in email system 104 are processed by the various functionality and work flows in social media computing system 102. The workflows in the social media application 121 also provide responses to those inputs. The responses are then presented to the user from within email system 104 by social media interaction system 126. Making calls to the social media application and receiving responses is indicated by block 136 in the flow diagram of FIG. 2.

Figure 3:
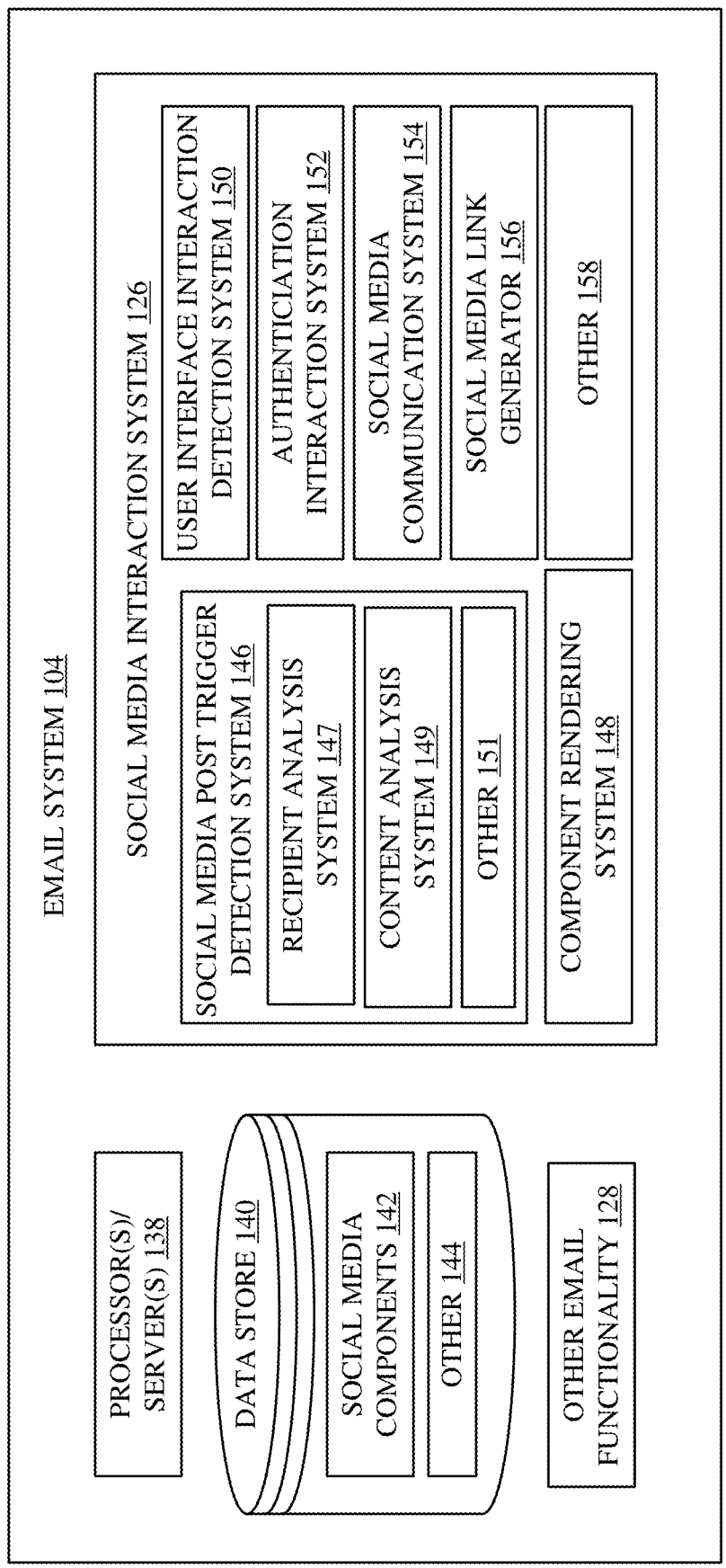
FIG. 3 is a block diagram showing an email system in more detail.

FIG. 3 is a block diagram showing one example of email system 104 in more detail. Email system 104 can include one or more processors or servers 138, data store 140 which can include social media components 142 that have been downloaded to email system 104 from a social media application 121 running on social media computing system 102, and other items 144. Social media interaction system 126 can include social media post trigger detection system 146, component rendering system 148, user interface interaction detection system 150, authentication interaction system 152, social media communication system 154, social media link generator 156, and other items 158. System 146 can include recipient analysis system 147, context analysis system 149, and other items 151.

Before describing the operation of email system 104 in more detail, a description of some of the items in email system 104 and their operation will first be provided. Social media post trigger detection system 144 detects a trigger indicating that a user (in this case user 114) wishes to make a post from within email system 104 to his or her social media account in social media application 121 running on social media computing system 102. For instance, email system 104 may use one of the social media components 142 to display a button, or link, or dropdown menu, or another actuator that user 104 can actuate in order to indicate that user 104 wishes to provide content for social media computing system 102. In another example, recipient analysis system 147 may analyze recipients of an email message being authored by the user and suggest that the user post the content of the email message to social media application 121. Similarly, content analysis system 149 can analyze the content of an email message being authored by the user and suggest that the content be posted to social media application 121.

Component rendering system 148 then accesses social media components 142 in data store 140 to render a UI that allows user 104 to input content that is to be posted to a destination in social media application 121. User interface interaction detection system 150 detects user interactions with the displayed UI. Once content has been entered, authentication interaction system 152 accesses authentication system 103 to authenticate user 114 to social media computing system 102. Social media communication system 154 then communicates the content input by user 114, along with authentication information (such as a token or other authentication information), to social media computing system 102. The workflows in social media computing system 102 then operate on the content (such as posting it to a user community in the social media application 121, posting it to the personal feed of user 114 in the social media application 121, or in other ways). Social media computing system 102 then provides a response indicating that the content was posted or otherwise processed in social media computing system 102. Social media link generator 156 can then surface the response to user 114, along with a link which can be actuated by user 114 to navigate user 114 to the location in the social media application 121 where the content was posted or otherwise processed.

Figure 4A:
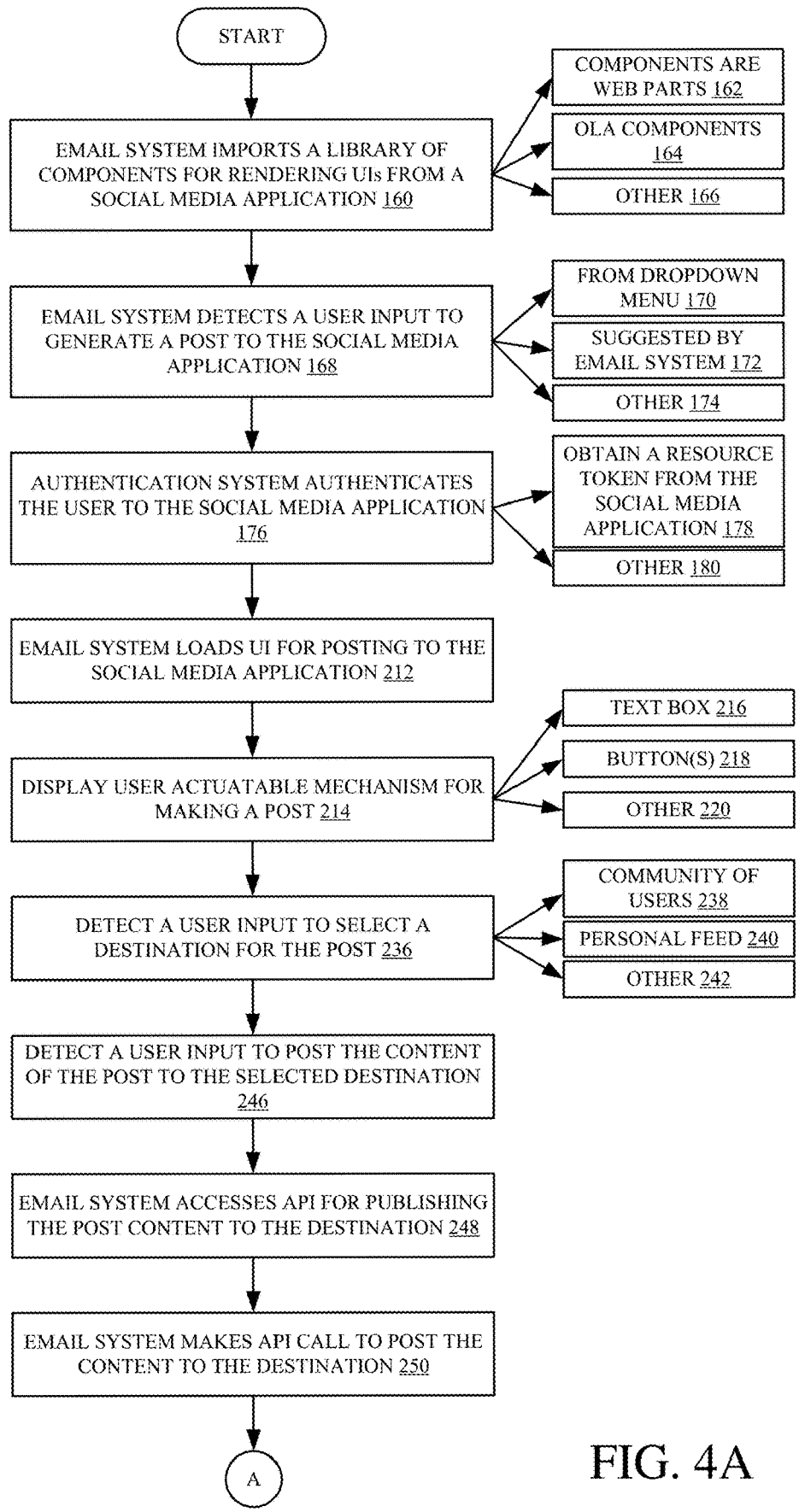
FIGS. 4A and 4B (collectively referred to as FIG. 4) show a flow diagram illustrating one example of the operation of a computing system in consuming and creating social media content within an email system.
Figure 4B:
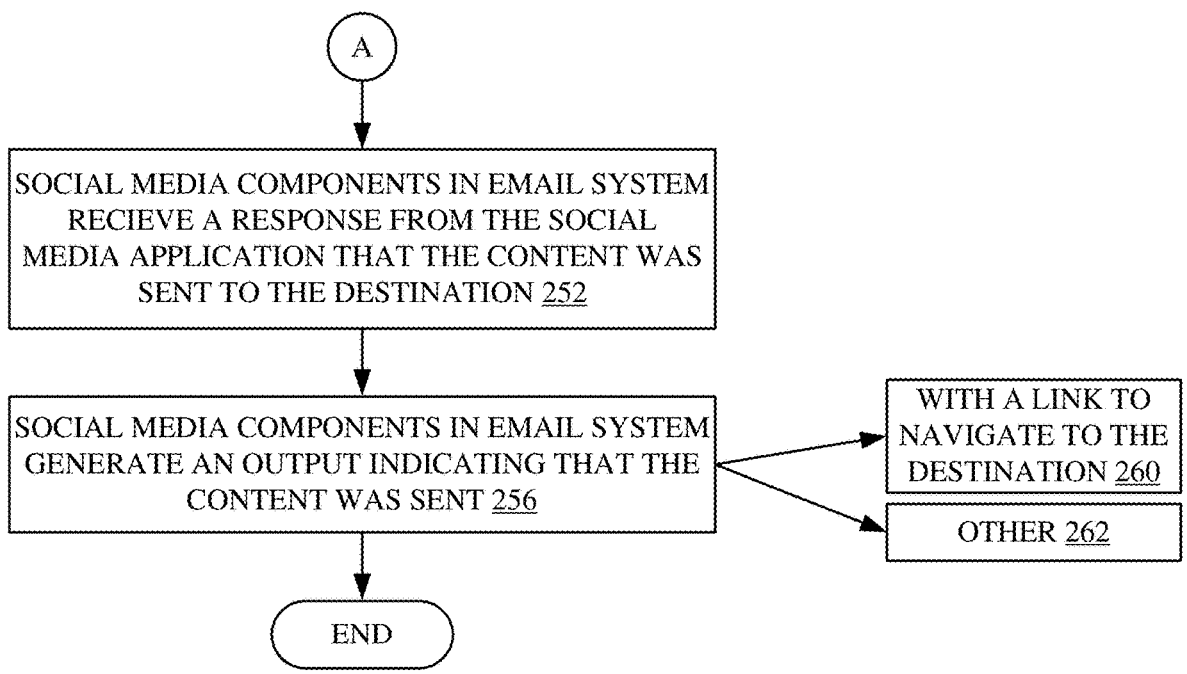

FIGS. 4A and 4B (collectively referred to herein as FIG. 4) show a flow diagram illustrating one example of the operation of computing system architecture 100 in allowing user 114 to make a post to a social media application 121 running on social media computing system 102 from within email system 104, using social media interaction system 126. It is first assumed that social media communication system 154 in email system 104 imports a library of social media components 142 for rendering UIs from the social media application 121. Importing the library of components for rendering UIs from social media computing system 102 is indicated by block 160 in the flow diagram of FIG. 4. The components can be web parts as indicated by block 162 or operation level agreement (OLA) components 164, or other components 166. Each of the components represents a UI which can be rendered by component rendering system 148 and interacted with by user 114.

At some point, social media post trigger detection system 146 detects a user input indicating that user 114 wishes to generate a post or provide other content, to the social media application 121, as indicated by block 168. The trigger can be detected based on user 114 actuating an actuator displayed in a dropdown menu, as indicated by block 170. In another example, the content or recipients of an email message being drafted by the user can be analyzed to determine whether the content should be provided as content in a post to a community or personal feed in the social media application 121 or in other ways. If so, that can be recommended to the user, and detected as a trigger. Detecting the trigger to generate content for the social media application based upon a suggestion by the email system is indicated by block 172 in the flow diagram of FIG. 4. The email system can detect a user input to generate a post to the social media application in other ways as well, as indicated by block 174.

FIGS. 6-13 show examples of user interface displays that user 114 can interact with in order to provide an input indicating that user 114 wishes to generate content that is to be posted to the social media account for user 114 in social media application 121.

Figure 6:
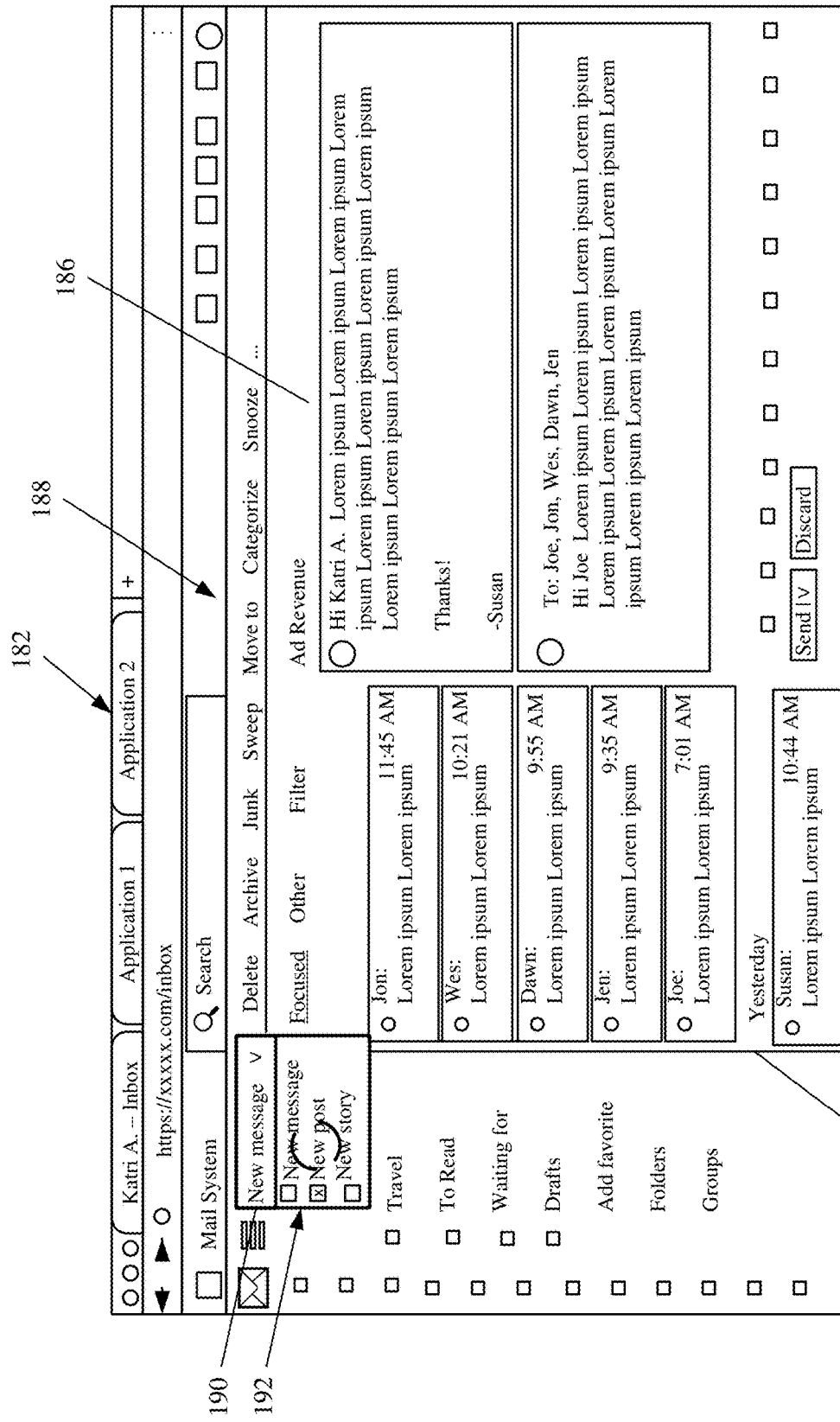
FIGS. 6, 7, 8, 9, 10, 11, 12, 13, 14, 15, 16, 17, 18, 19, and 20 show examples of user interface displays that can be generated from within an email system.

FIG. 6 shows one example of a user interface display that can be generated in email system 104 and that allows user 114 to provide an input indicating that user 114 wishes to generate content for the social media application 121, from within email system 104. FIG. 6 shows a user interface display 182 generated within email system 104 that shows a users in box 184 with message indicators, and a reading pane 186. Display 182 also include a set of control actuators 188, which include a "new message" actuator 190. In the example shown in FIG. 6, when the user actuates "new message" actuator 190, a dropdown menu 192 is displayed with actuators that allow the user to make a "new message", a "new post", or a "new story". Actuating the "new message" actuator causes email system 104 to navigate the user 114 through an experience that allows user 114 to generate a new email message. Actuating the "new post" actuator causes social media interaction system 126 to navigate the user through an experience which allows user 114 to provide content (such as text, a video, etc.) for posting to the user's social media account in social media application 121. The "new story" actuator, when actuated by user 114, causes social media interaction system 126 to generate a user interface which allows the user to generate content for posting to the user's personal feed in social media application 121. In the example shown in FIG. 6, the user is actuating the "new post" actuator. Actuation of this actuator can be detected by social media post trigger detection system 146 indicating that user 114 wishes to make a new post in the user's social media account in social media application 121.

Figure 7:
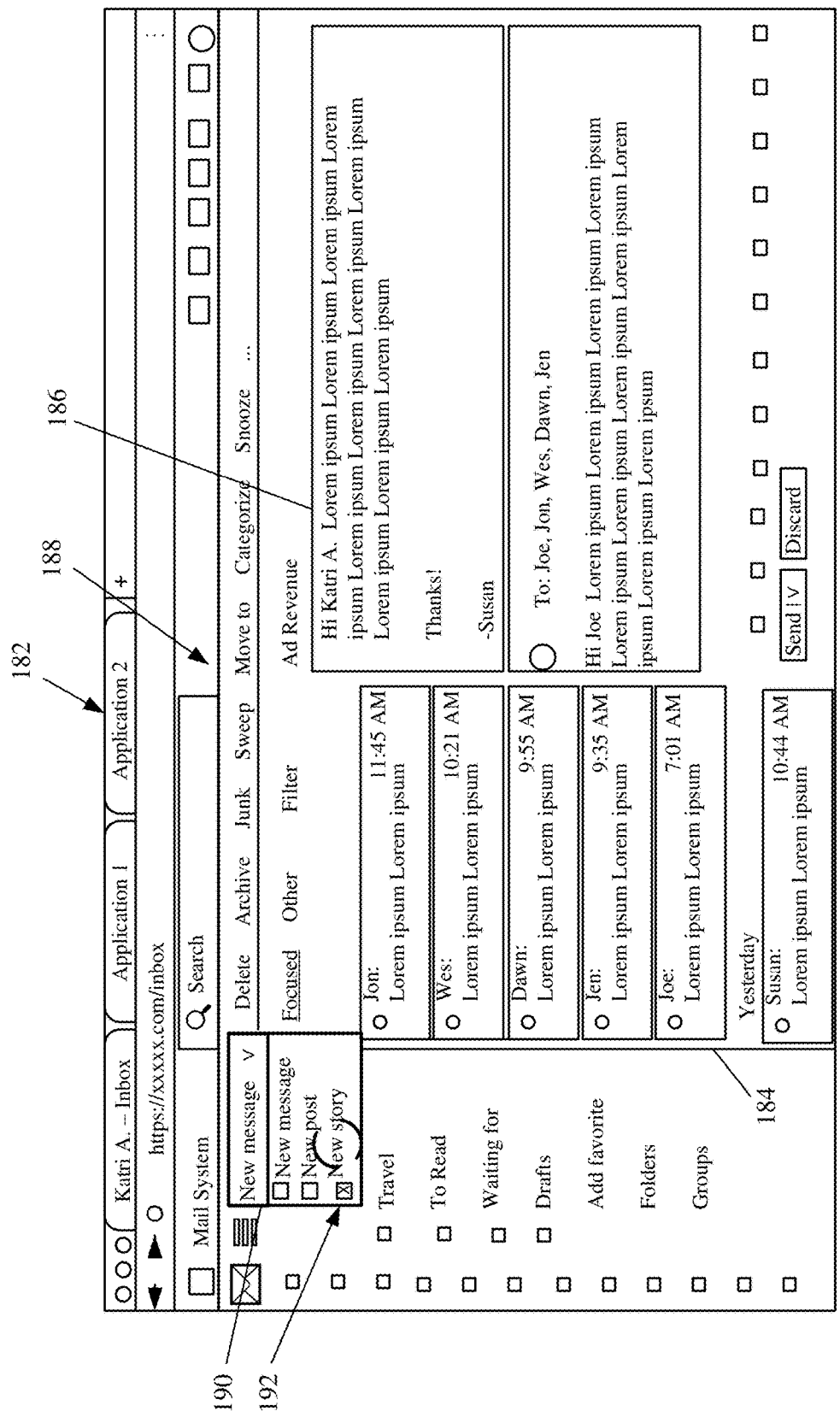

FIG. 7 is similar to FIG. 6, and similar items are similarly numbered. FIG. 7 shows that user 114 is actuating the "new story" actuator in dropdown menu 192. This actuation can be detected by social media post trigger detection system 146 as well.

Figure 8:
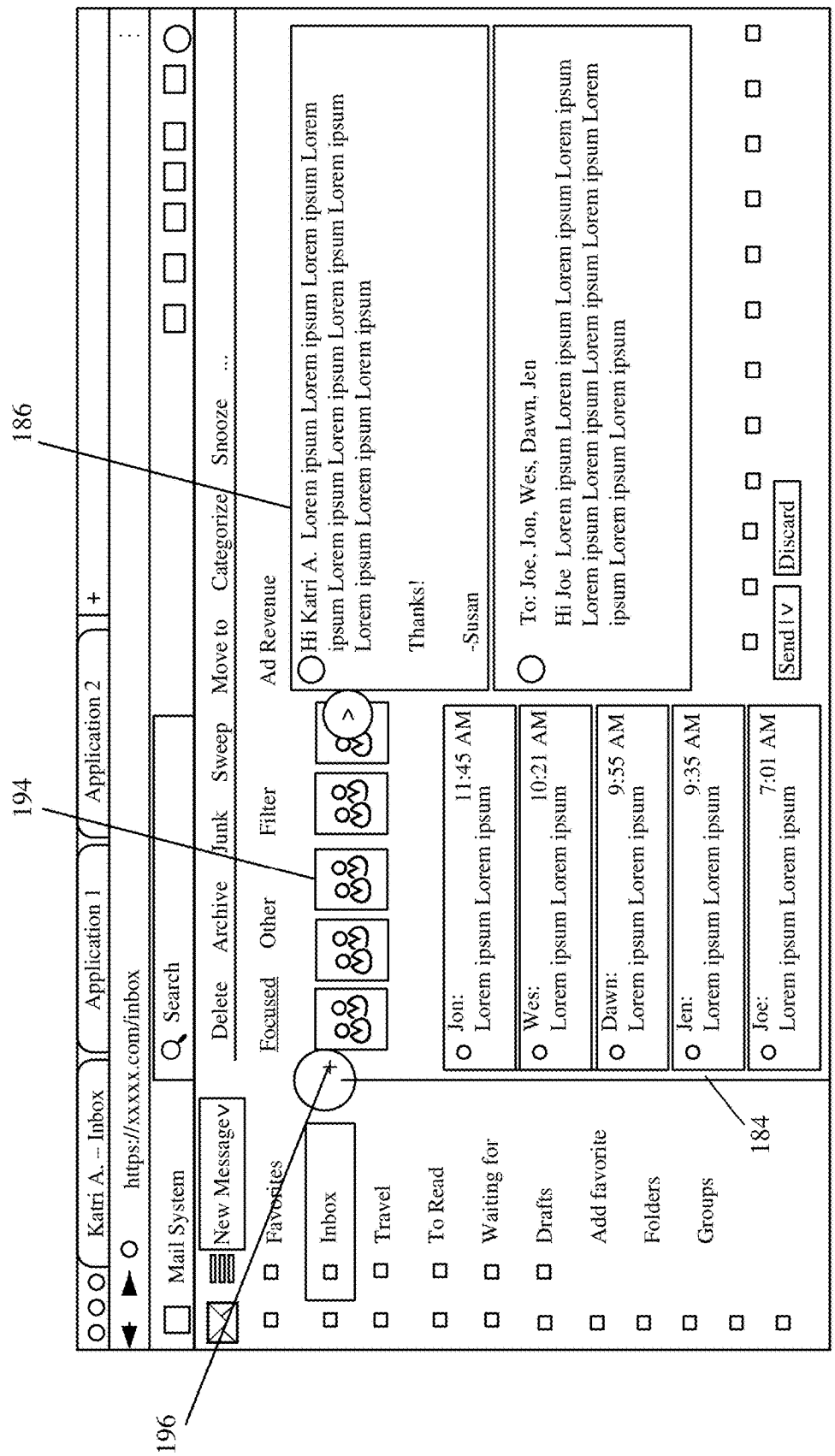

FIG. 8 is also similar to FIG. 6, and similar items are similarly numbered. However, FIG. 8 shows that social media interaction system 126 displays a set of story information 194 which illustrates different content in the social media account for user 114. FIG. 8 also shows that component rendering system 148 renders an actuator 196 which can be actuated by user 114 from the display 182 in email system 104. Actuation of actuator 196 can be detected by social media trigger detection system 146 as indicating that user 114 wishes to add social media content to his or her account in social media application 121.

Figure 9:
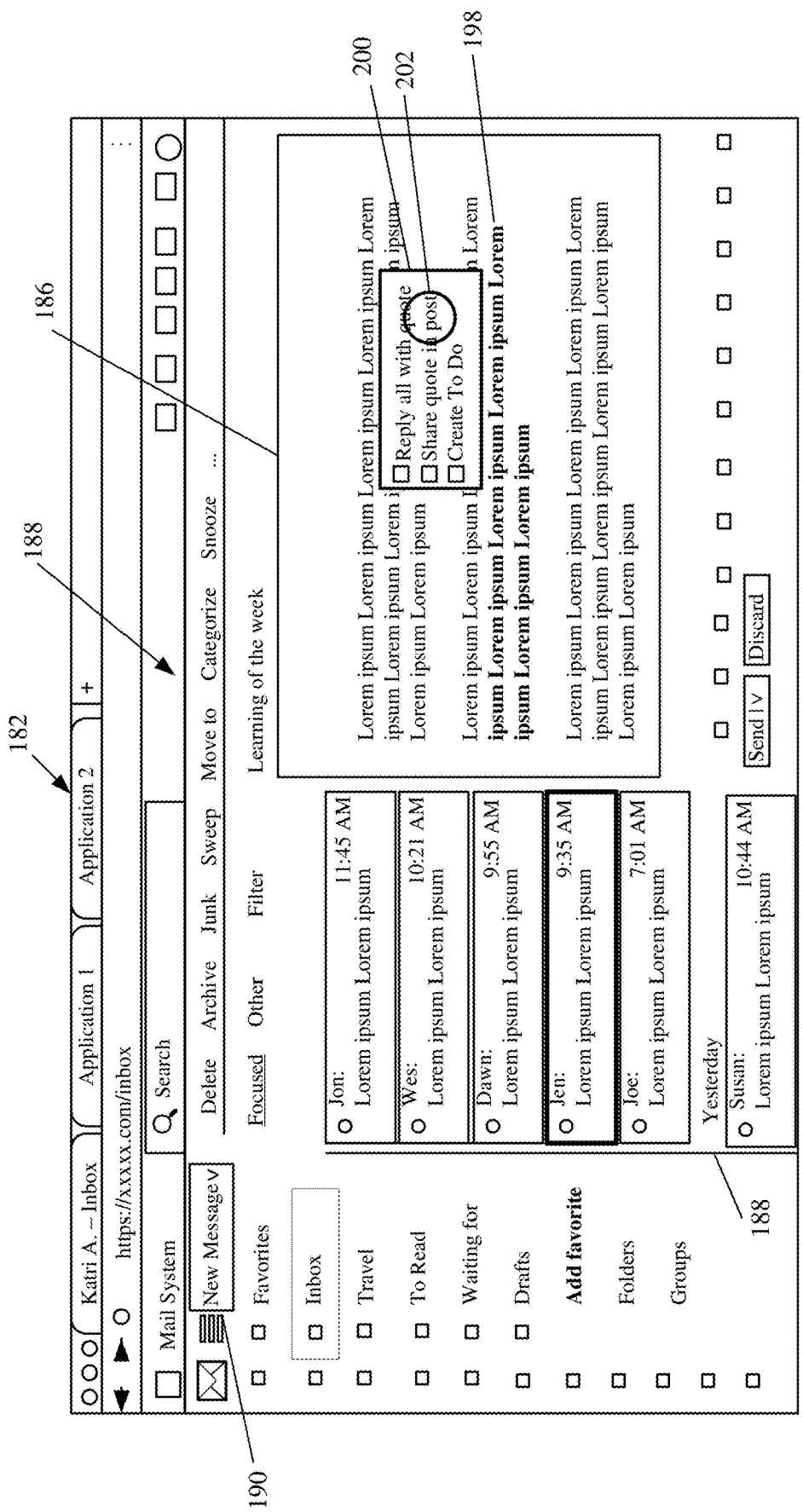

FIG. 9 is a user interface display which is similar to that shown in FIG. 8, and similar items are similarly numbered. However, in FIG. 9, it can be seen that the user has highlighted some text in a highlighted area 198, and then right clicked (for example) on the highlighted text. This causes social media interaction system 126 to display another menu 200 with a set of actuators, including actuator 202. Actuator 202, when actuated by the user, navigates the user 114 through an experience that allows the user to share the highlighted material 198 as a quote in a post to the social media account of user 114 in social media application 121.

Figure 10:
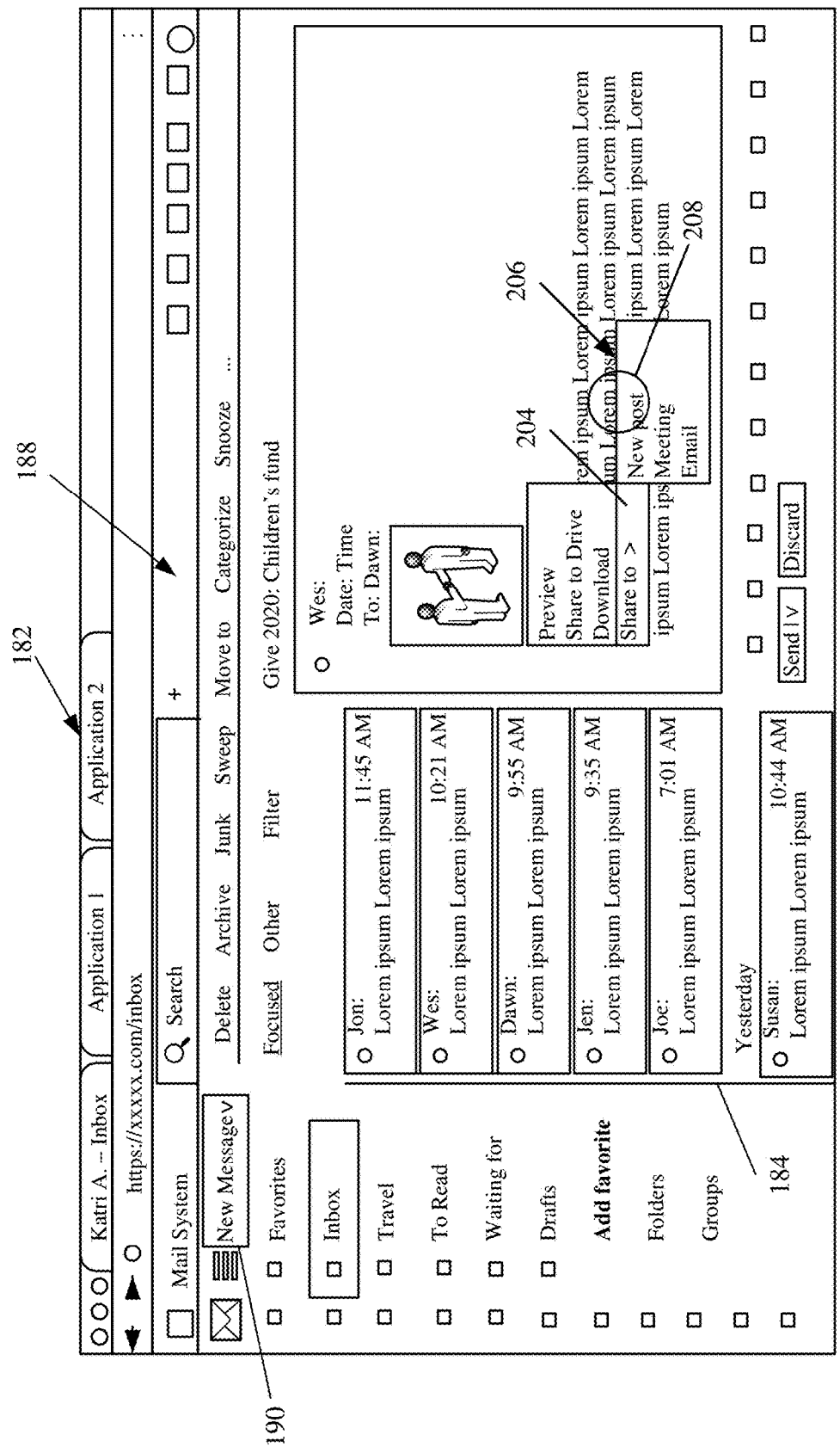

FIG. 10 is similar to similar to FIG. 9, and similar items are similarly numbered. However, in FIG. 10, an additional actuator 204 is displayed for user 114. When actuated, actuator 204 causes another menu 206 to be displayed which includes a "new post" actuator 208. When the user actuates the "new post" actuator 208, this is detected by social media post trigger detection system 146 indicating that user 114 wishes to share the content of the email as a new post in the social media application 121.

Figure 11:
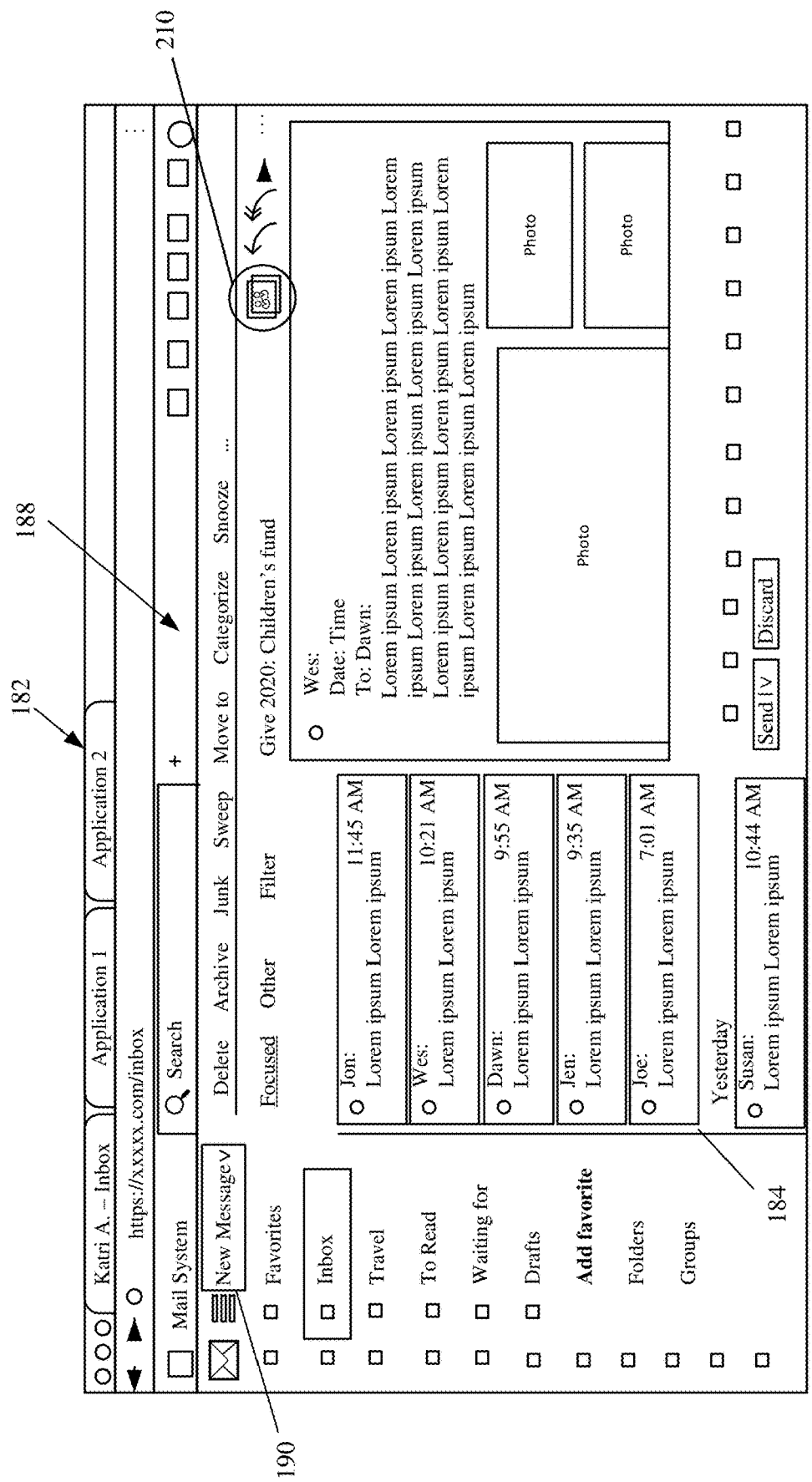

FIG. 11 is similar to similar to FIG. 10, and similar items are similarly numbered. However, FIG. 11 shows that an additional icon or actuator 210 can be generated on an email message viewing pane. When the user 114 actuates actuator 210, this is detected by social media trigger detection system 146 as indicating that user 114 wishes to share the entire email message to the user's social media account in social media application 121.

Figure 12:
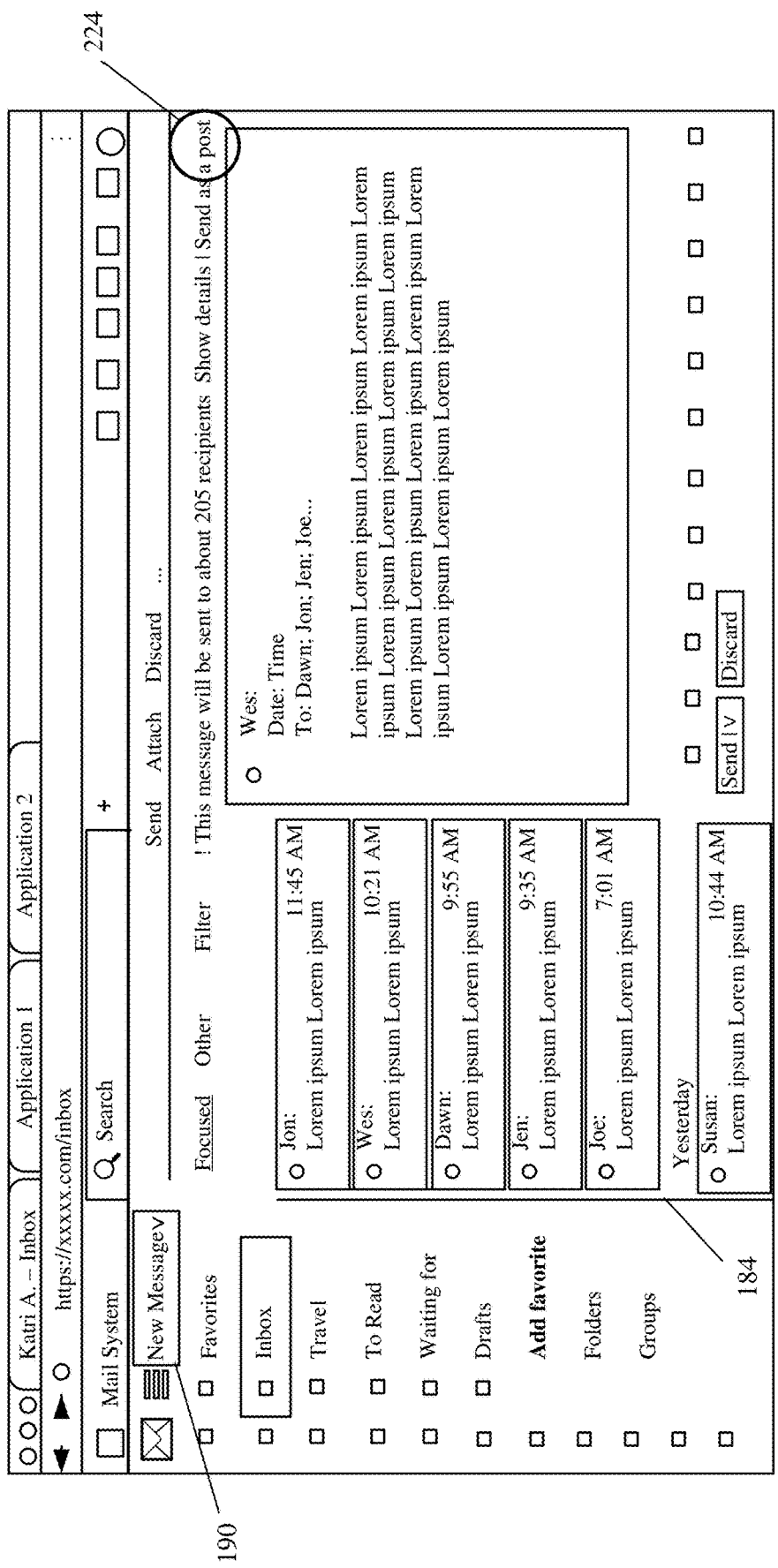

FIG. 12 is similar to similar to FIG. 11, and similar items are similarly numbered. However, FIG. 12 shows that the recipients of an email message being authored by a user can be analyzed by recipient analysis system 147. Based upon the recipients of the email message that is being authored by user 114, a recommendation actuator 224 can be displayed. By way of example, it may be that the recipients are all in a community in the social media application 121 that is accessible by user 114. In that case, based upon the recipients that have been listed in the email message, social media post trigger detection system 146 can suggest that the content be entered as a post in the social media application 121, instead of as (or in addition to) an email message. If user 114 actuates actuator 224, the user is navigated through an experience that allows the user to input the content of the email as a post to a community in the social media application 121.

Figure 13:
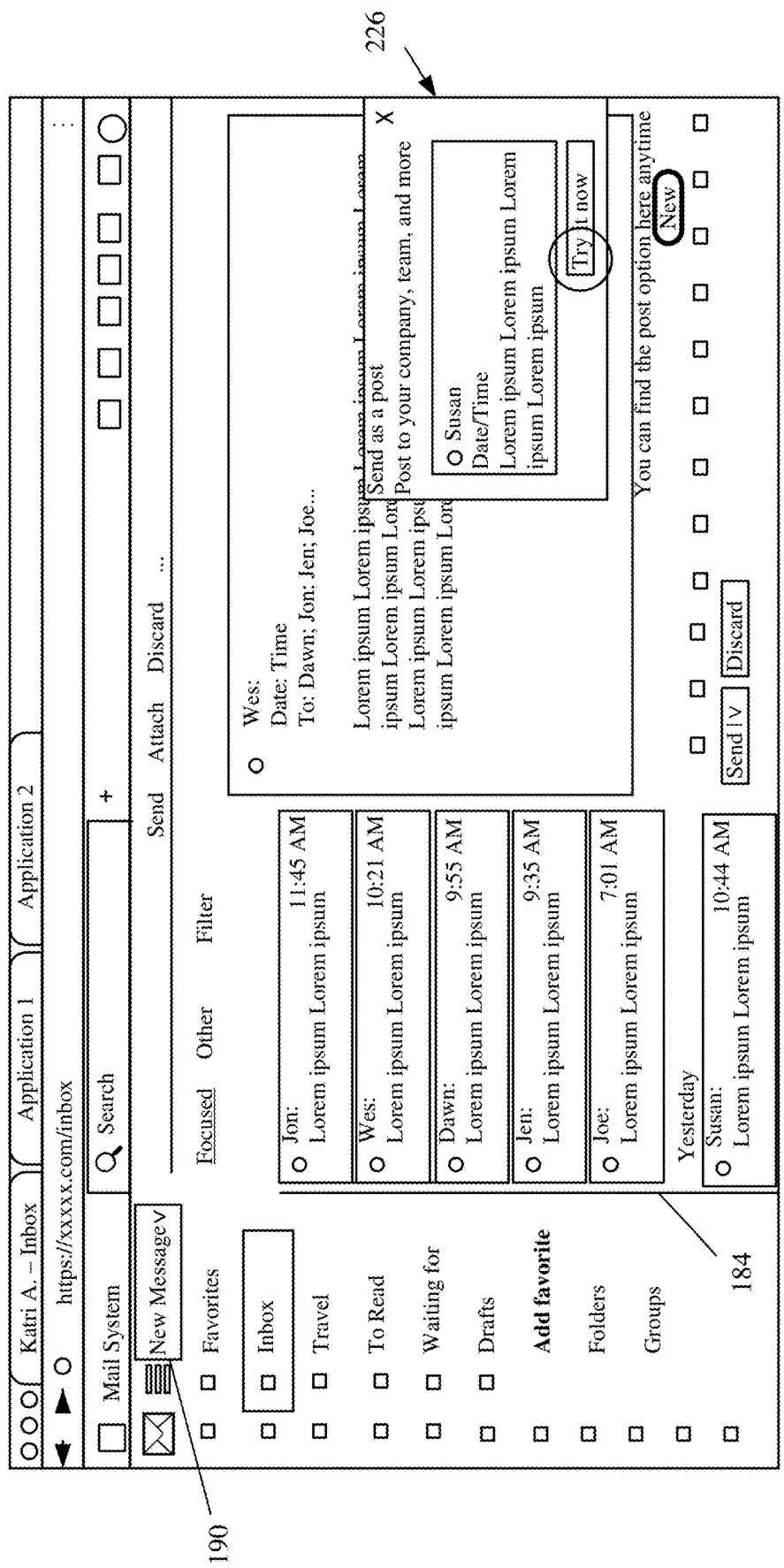

FIG. 13 is similar to FIG. 12, and similar items are similarly numbered. However, FIG. 13 shows that content analysis system 149 can analyze the content being input by user 114 into an email message and generate a suggestion 226 suggesting that the content be entered as a post in the social media account for the user 114. For example, a community in the social media application 121 may be particularly interested in a subject matter. When that subject matter appears in the content of an email message being authored by user 114, then content analysis system 149 can generate the user interface mechanisms 226 which allows user 114 to enter the content as a post to the social media application 121 instead of as an email message. In another example, the message can be sent both as an email and as a post to the social media account. These are examples only.

Authentication interaction system 152 then interacts with authentication system 103 to authenticate the user 114 to the social media application 121, as indicated by block 176 in the flow diagram of FIG. 4. For instance, authentication interaction system 152 can obtain a resource token from the social media application 121, using authentication system 103, as indicated by block 178. Authentication interaction system 152 can authenticate user 114 to the social media application 121 in other ways as well, as indicated by block 180.

Once a trigger is detected, component rendering system 148 then accesses a social media component 142 that defines a UI that is to be rendered based on the detected trigger. Loading the UI for posting social content to the social media application 121 from within email system 104 is indicated by block 212 in the flow diagram of FIG. 4. Component rendering system 148 then renders the component so the user actuatable mechanisms are displayed allowing the user to make a post or otherwise input content for the social media application 121. Displaying the user actuatable mechanism for making a post is indicated by block 214 in the flow diagram of FIG. 4. In one example, the mechanism is a text box 216 or other authoring mechanism into which user 114 can type text. In another example, the mechanism can be a set of buttons, icons, or other actuators, as indicated by block 218. The user actuatable mechanisms for making a post can be displayed in other ways and include other mechanisms, as indicated by block 220.

Figure 14:
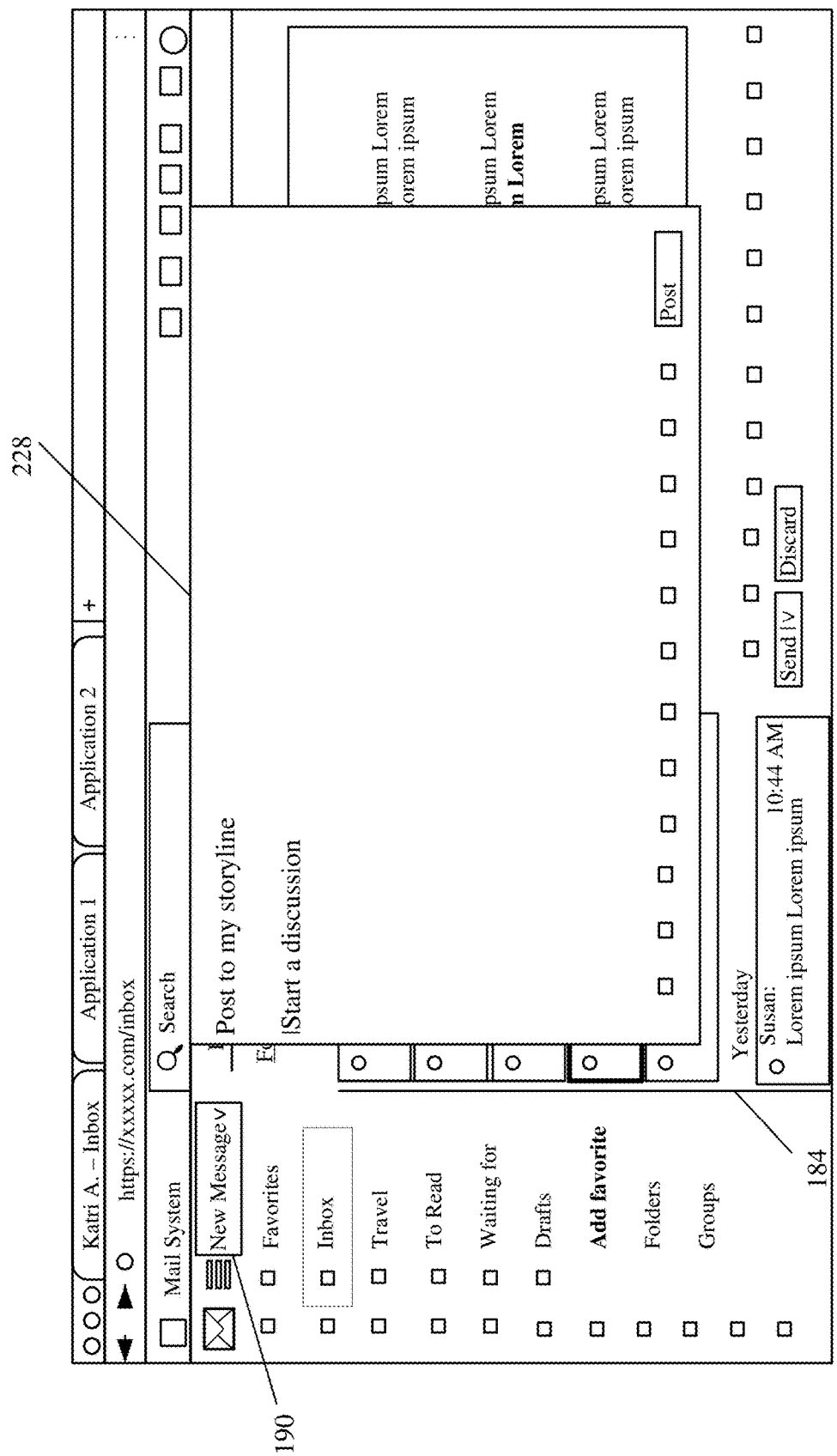

FIG. 14 is similar to FIG. 6, except that FIG. 14 now shows an example of a user interface in which component rendering system 148 has rendered a social media component 142, in the form of a text entry mechanism 228. User 114 can type content into the text entry mechanism 228, which will then be posted as a post in the social media account of user 114 in social media application 121.

At some point, the user can also select a destination for the post (such as a particular community in the social media application 121, the user's personal feed in the social media application 121, or other destination(s). Detecting a user input to select a destination for the post is indicated by block 236 in the flow diagram of FIG. 4. Selecting the destination as a community or group of users is indicated by block 238. Selecting the destination as a personal social media feed is indicated by block 240. The destination can be selected in other ways, and the destination can be a wide variety of other social media destinations as well, as indicated by block 242.

Figure 15:
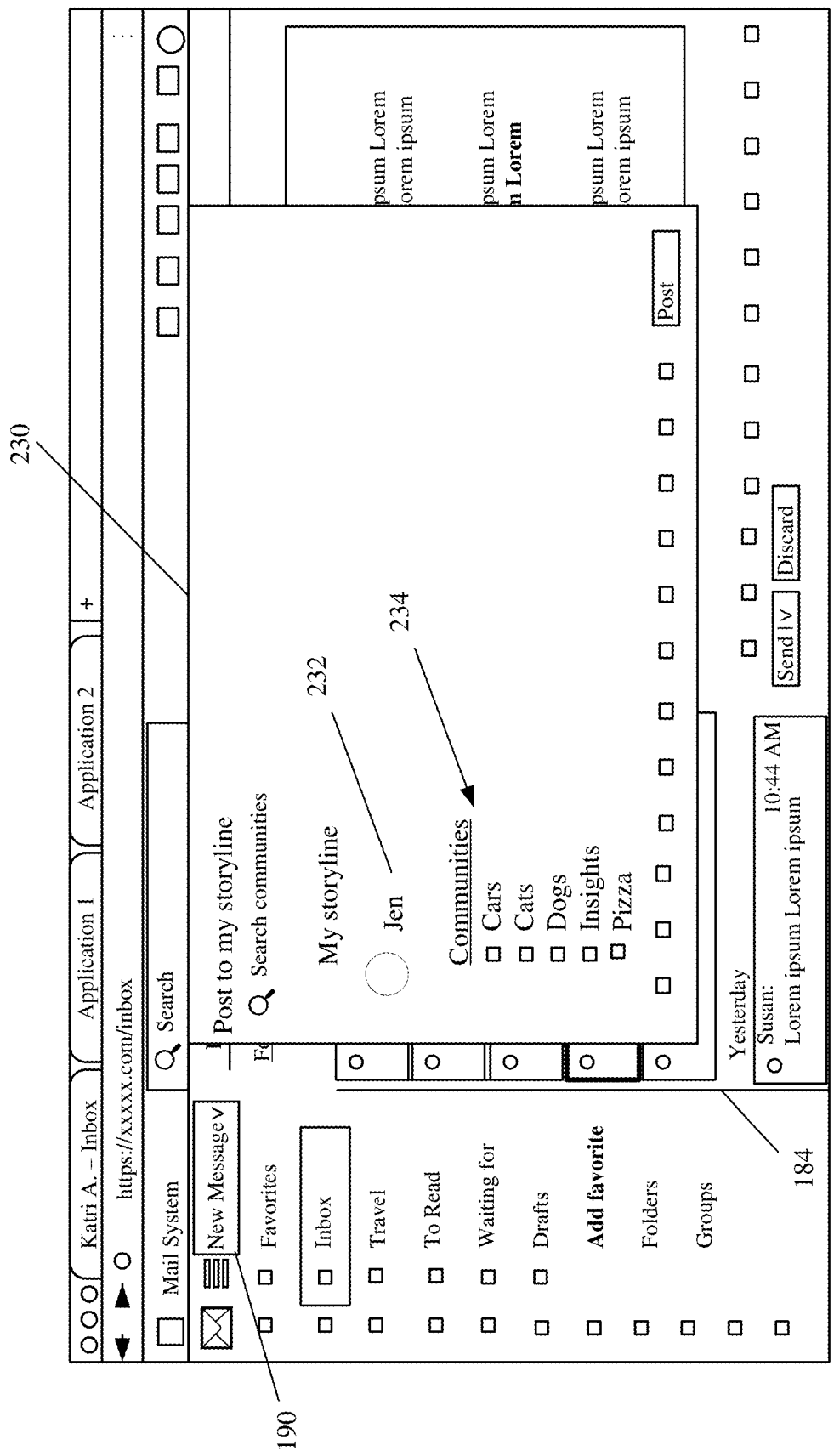

FIG. 15 shows one example of a user input mechanism 230 that can be generated by component rendering system 148 which allows user 114 to select a destination. An actuator 232 can be actuated to post the content to the user's personal feed in social media application 121. One or more other actuators 234 can be actuated by user 114 to post the content to one or more communities or groups of users in social media application 121.

Figure 16:
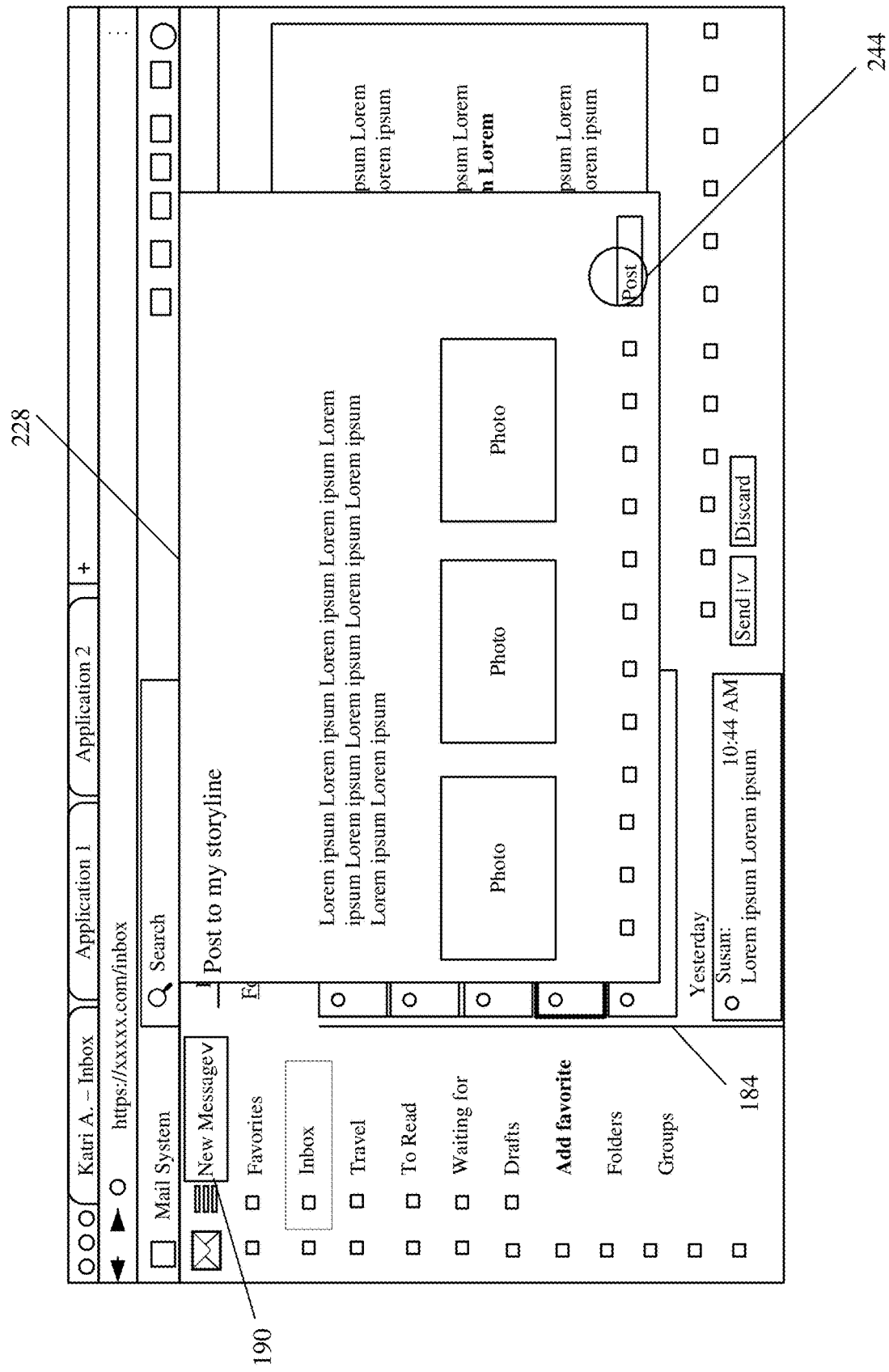

User 114 then actuates a post actuator to post the content to the social media application 121 at the selected destination. Detecting a user input to post the content to the selected destination in the social media application 121 is indicated by block 246 in the flow diagram of FIG. 4. Social media communication system 154 then accesses application programming interfaces (APIs) exposed by the social media computing system 102 to publish or post the content to the destination within the social media application 121. Accessing the APIs to post the content is indicated by block 248 in the flow diagram of FIG. 4. The social media communication system 154 in email system 104 then calls the API to post the content to the destination, as indicated by block 250. Generating the output 254 indicating that the content was sent to the social media application 121 is indicated by block 256 in the flow diagram of FIG. 4. FIG. 16 shows one example in which user 114 has generated content within the text entry box 228. User 114 can then actuate the "post" actuator 244 which is detected by interaction detection system 150. In response, social media communication system 154 communicates the content to the social media application 121.

Figure 17:
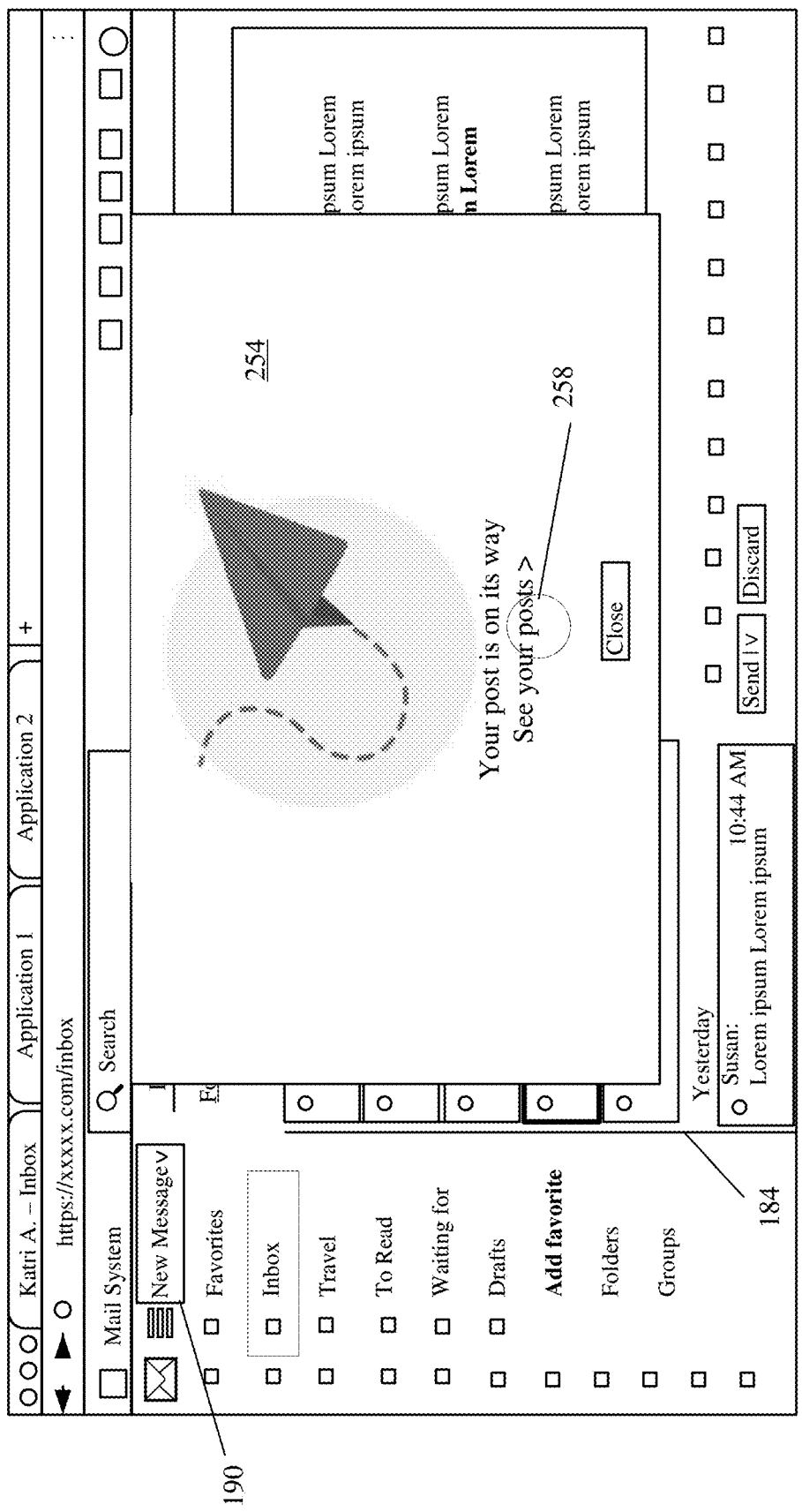

The social media application 121 can also generate and provide a response, indicating that the content has been sent to, or received by, the social media application 121. Receiving such a response using the social media components is indicated by block 252 in the flow diagram of FIG. 4. FIG. 17 is one example of a user interface display showing such a response. FIG. 17 shows a message 254 which indicates that the post has been sent to the social media application 121.

In one example, social media link generator 156 also obtains or generates a link to the post in the social media application 121 so that, by actuating that link, user 114 can automatically navigate to the destination in social media application 121 where the post was made.

The social media components 142 can generate an output indicating that the post was sent to the social media application 121 as indicated by block 256. Display element 254 also includes link 258 which can be actuated to navigate to the destination of the post in the social media application 121. Displaying output 254 with a link 258 to the social media application is indicated by block 260 in the flow diagram of FIG. 4. The social media components 142 can generate an output indicating that the content was sent to the social media application 121 in other ways as well, as indicated by block 262.

Figure 18:
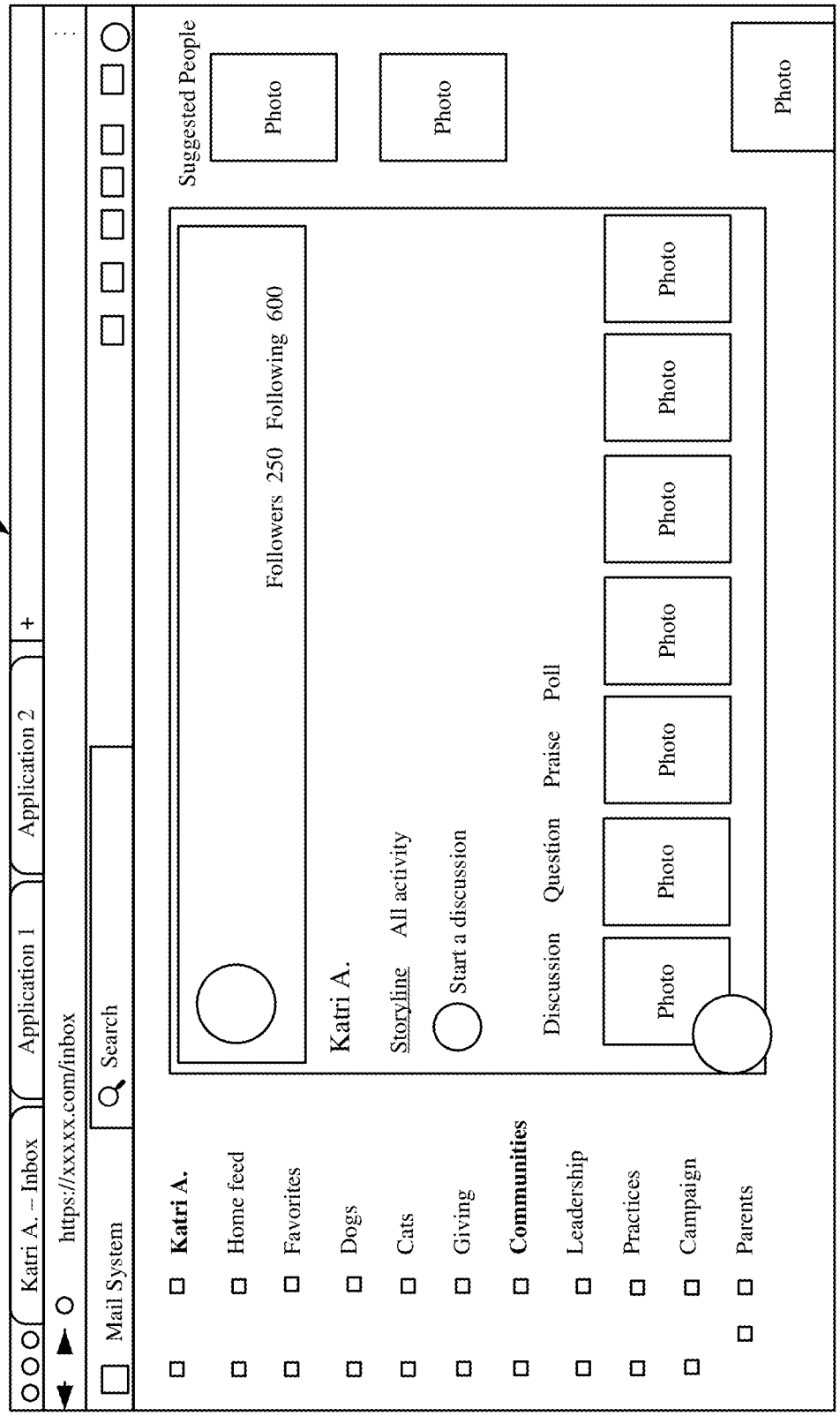

FIG. 18 is a block diagram showing a user interface display 264 that may be displayed when user 214 actuates link 258. It can be seen that user 114 is now navigated to the destination in the social media application 121 where the post was made.

Figure 5:
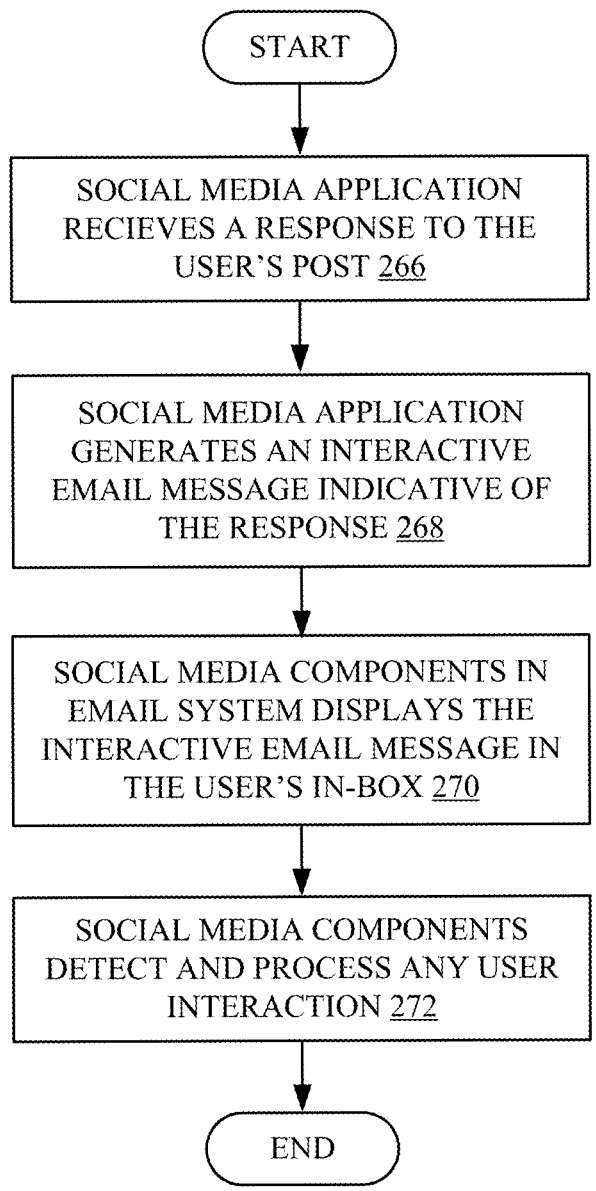
FIG. 5 is a flow diagram illustrating the operation of a social media application in receiving content from an email system.

FIG. 5 is a flow diagram showing one example of the operation of the computing system architecture 100 in which the post from user 114 has been posted to the selected destination in social media application 121, and in which another user has responded to or interacted with that post in some way (such as liking it, commenting on it, etc.). Social media application 121 first receives a response to the user's post, as indicated by block 266 in the flow diagram of FIG. 5. The social media application 121 then calls an API on email system 104 or otherwise accesses email system 104 to generate an interactive email message, indicative of the response, as indicated by block 268. Social media communication system 154 in email system 104 receives an indication of that email, within email system 104, and displays the interactive email message in the user's inbox, as indicated by block 270. The social media components 142 then detect and process any user interactions with the interactive email message. For instance, it may be that the same types of actuators that show up on UIs in social media application 121 are also presented on the interactive email message within email system 104 by the social media components loaded by social media interaction system 126 so that user 114 can perform the same types of interactions (like, comment, etc.) from within email system 104, as user 114 can perform within social media application 121. The social media components 142 corresponding to the UIs can be rendered and interacted with within email system 104. Detecting and processing any user interaction is indicated by block 272 in the flow diagram of FIG. 5.

Figure 19:
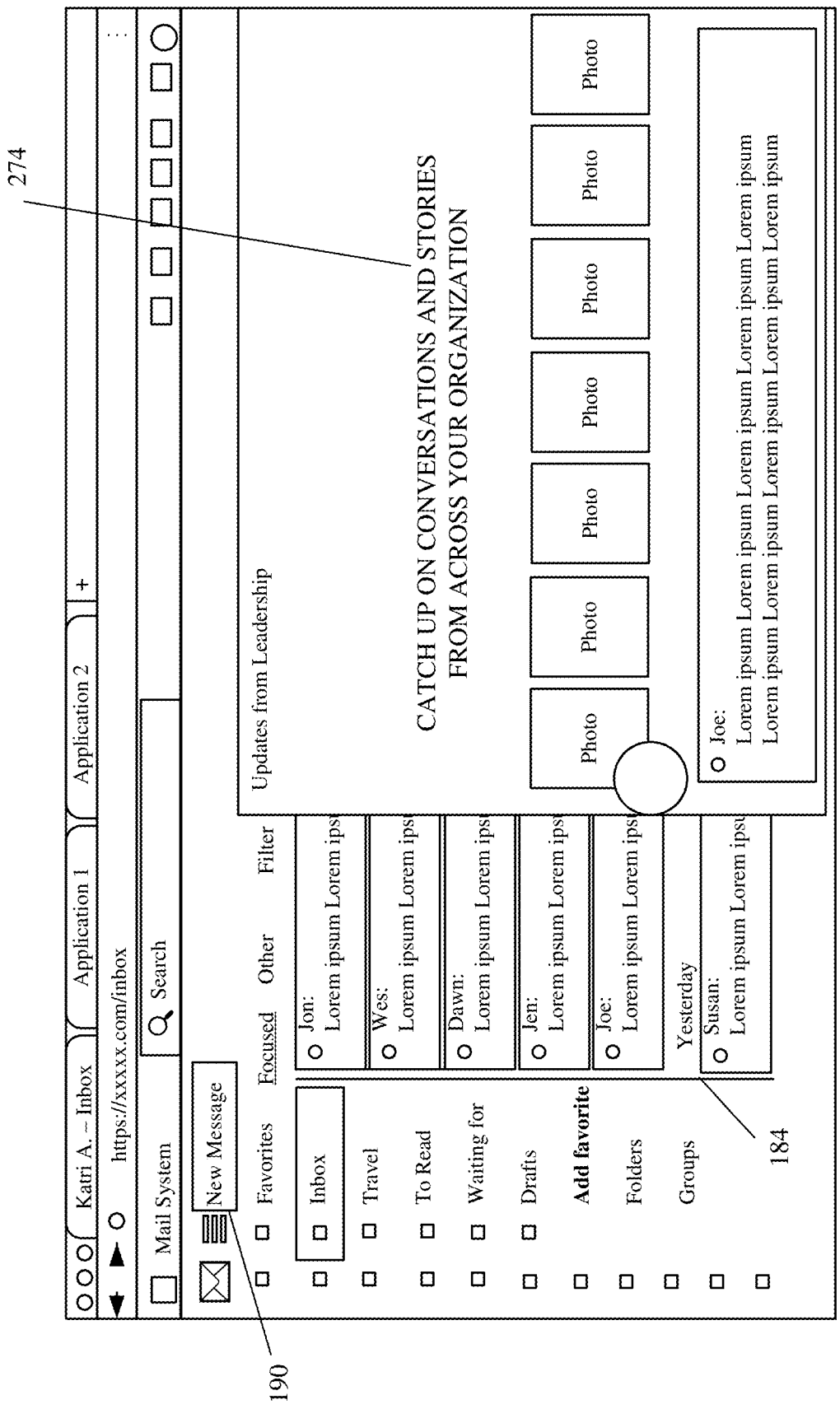
Figure 20:
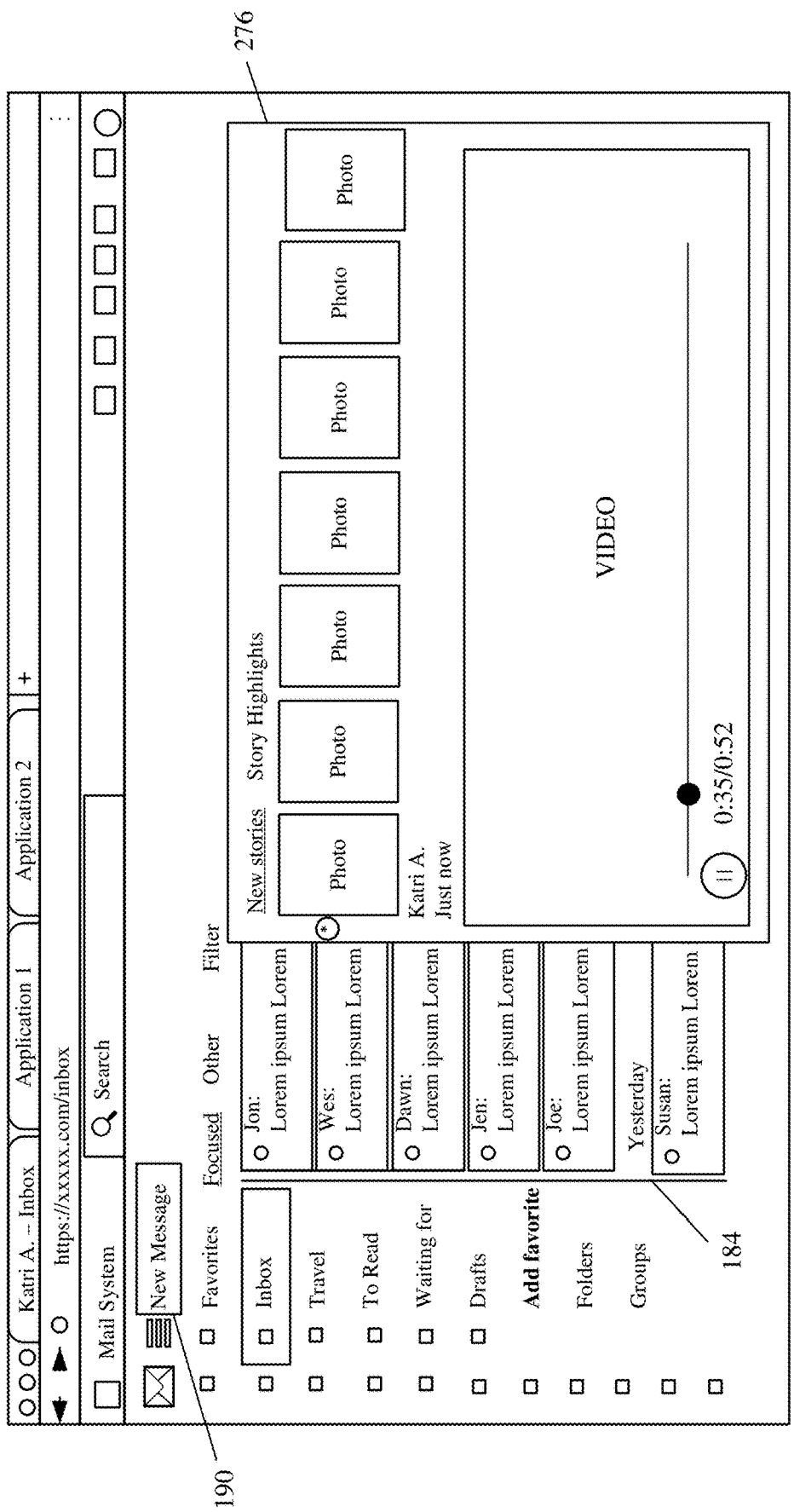

By way of example, FIG. 19 shows a user interface display in which a digest 274 of the user's social media application is displayed within the user's inbox in email system 104. The digest 274 shows a plurality of different stories (e.g., video messages) that have been recorded in a destination in social media application 121 accessible by user 114. User 114 can actuate or select one of those stories and social media communication system 154 then displays the story (e.g., video content) within email system 104 over the email box of user 114. FIG. 20 shows one example in which a video display 276 is displayed within an email viewing pane in email system 104.

It can thus be seen that the present system includes a social media interaction system 126 which inputs social media components 142 that allow social media content to be consumed within email system 104 and created and posted to the social media application 121 from within email system 104.

It will be noted that the above discussion has described a variety of different systems, components, functionality, and/or logic. It will be appreciated that such systems, components, functionality, and/or logic can be comprised of hardware items (such as processors and associated memory, or other processing components, some of which are described below) that perform the functions associated with those systems, components, functionality, and/or logic. In addition, the systems, components, functionality, and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components, functionality, and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The interfaces can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 21:
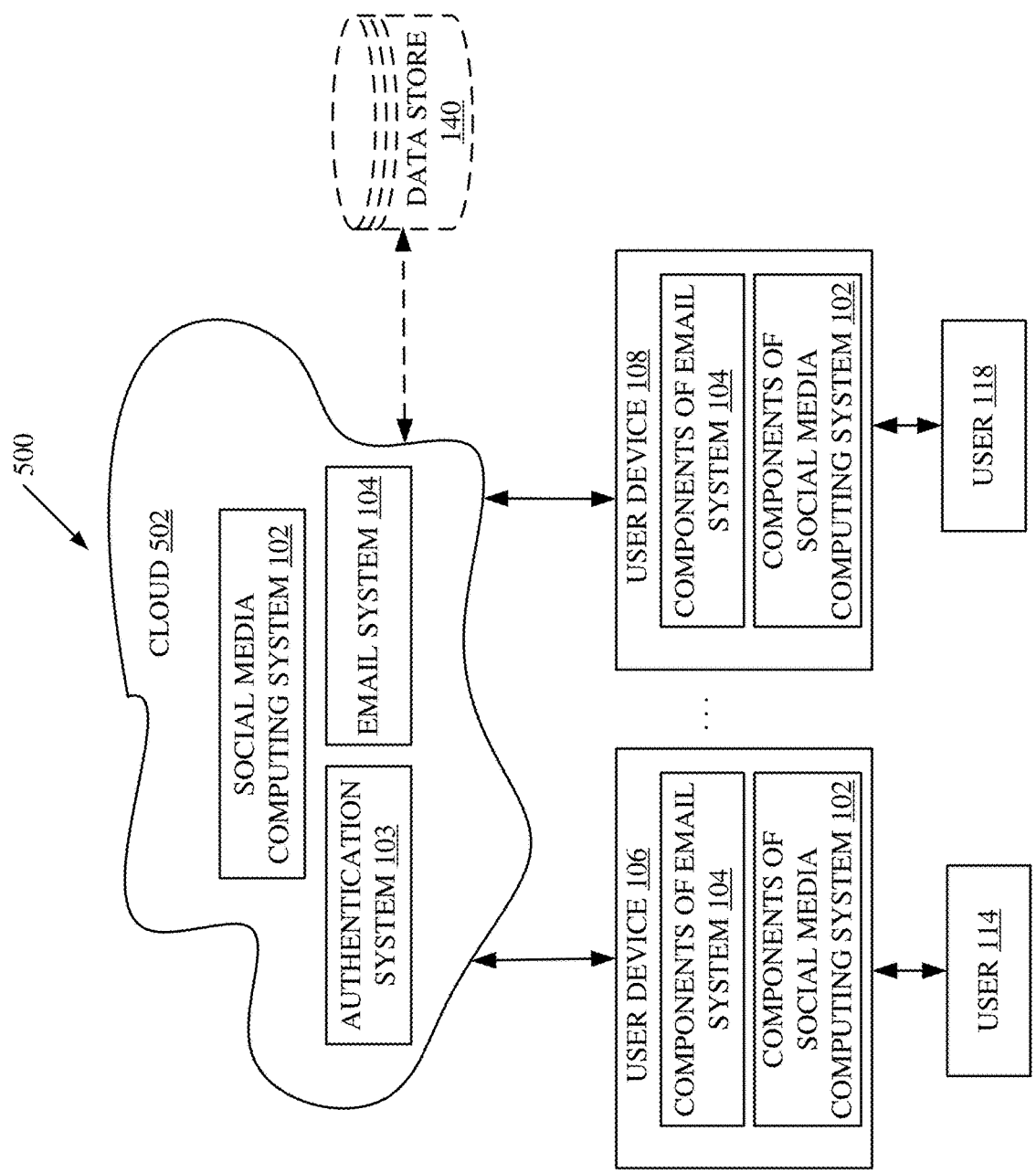
FIG. 21 is a block diagram showing one example of the computing system architecture illustrated in FIG. 1, deployed in a cloud computing architecture.

FIG. 21 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 21, some items are similar to those shown in FIG. 1 and they are similarly numbered. FIG. 21 specifically shows that social media computing system 102, email computing system 104, and authentication system 103 can be located in cloud 502 (which can be public, private, or a combination where portions are public while others are private). Therefore, users 114-118 use user devices 106-108 to access those systems through cloud 502.

FIG. 21 also depicts another example of a cloud architecture. FIG. 21 shows that it is also contemplated that some elements of system 102 can be disposed in cloud 502 while others are not. By way of example, some or all items or components of system 102 and 104 can run on browsers in user devices 106-108 or elsewhere. Also, data store 140 can be disposed outside of cloud 502, and accessed through cloud 502. Regardless of where the items are located, the items can be accessed directly by devices 114-118, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 22:
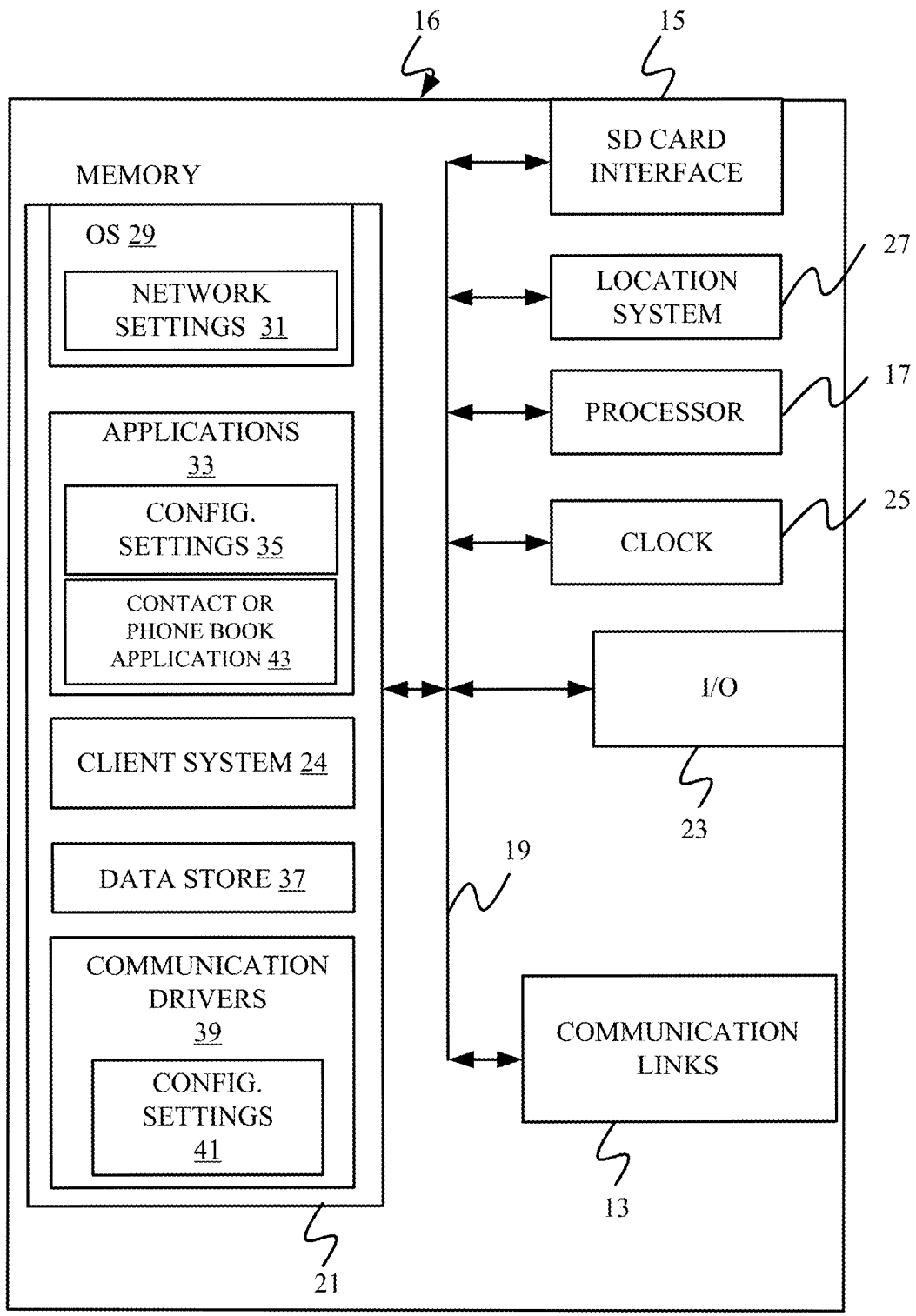
FIGS. 22, 23 and 24 are examples of mobile devices that can be used in the architectures discussed above.
Figure 23:
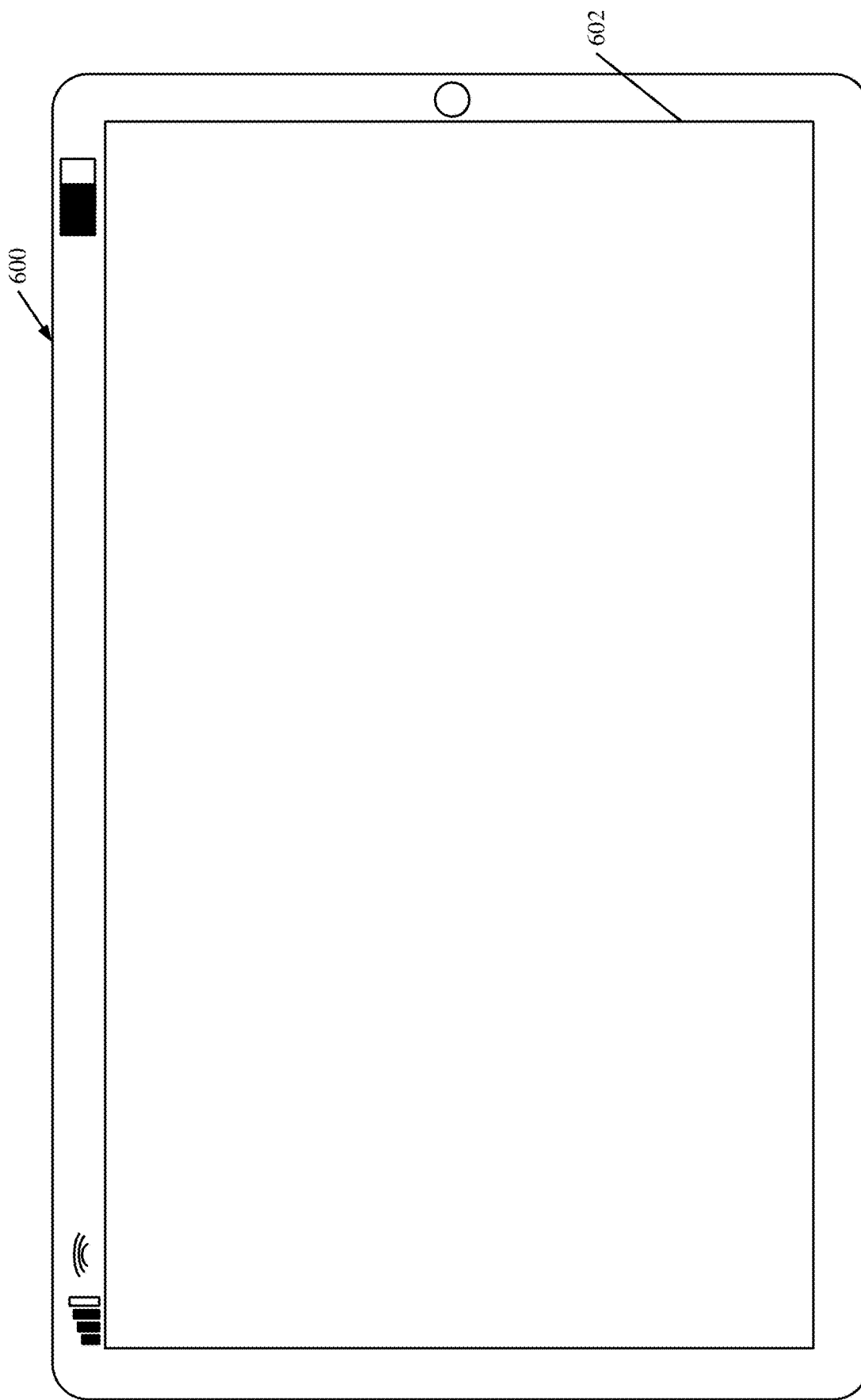
Figure 24:
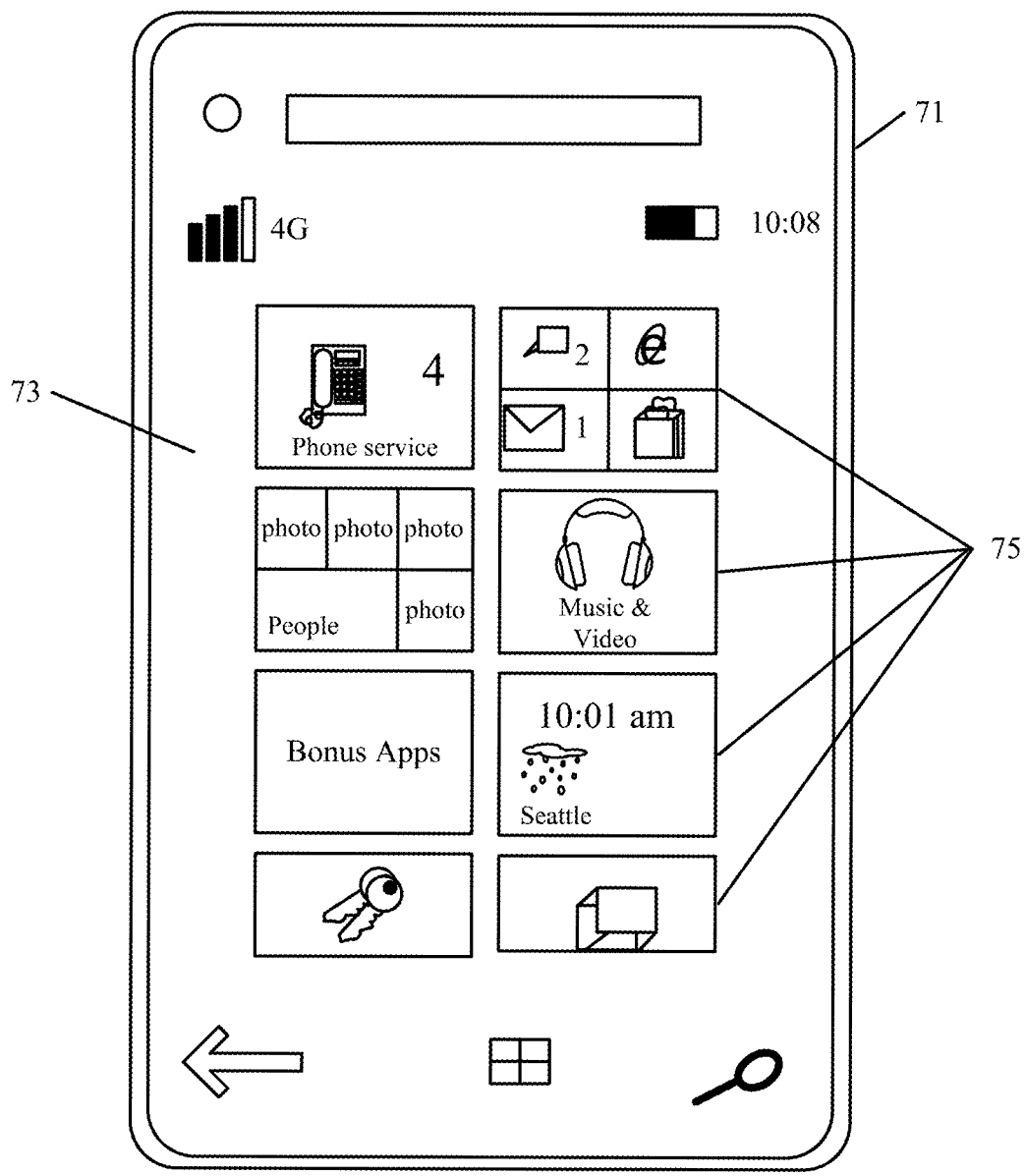

FIG. 22 is a simplified block diagram of one illustrative example of a handheld or mobile computing device that can be used as a user's or client's hand held device 16, in which the present system (or parts of it) can be deployed. FIGS. 23-24 are examples of handheld or mobile devices.

FIG. 22 provides a general block diagram of the components of a client device 16 that can run components computing systems 102, 103, and/or 104 or user devices 114-118 or that interacts with architecture 100, or both. In the device 16, a communications link 13 is provided that allows the handheld device to communicate with other computing devices and under some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 23 shows one example in which device 16 is a tablet computer 600. In FIG. 23, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 24 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 25:
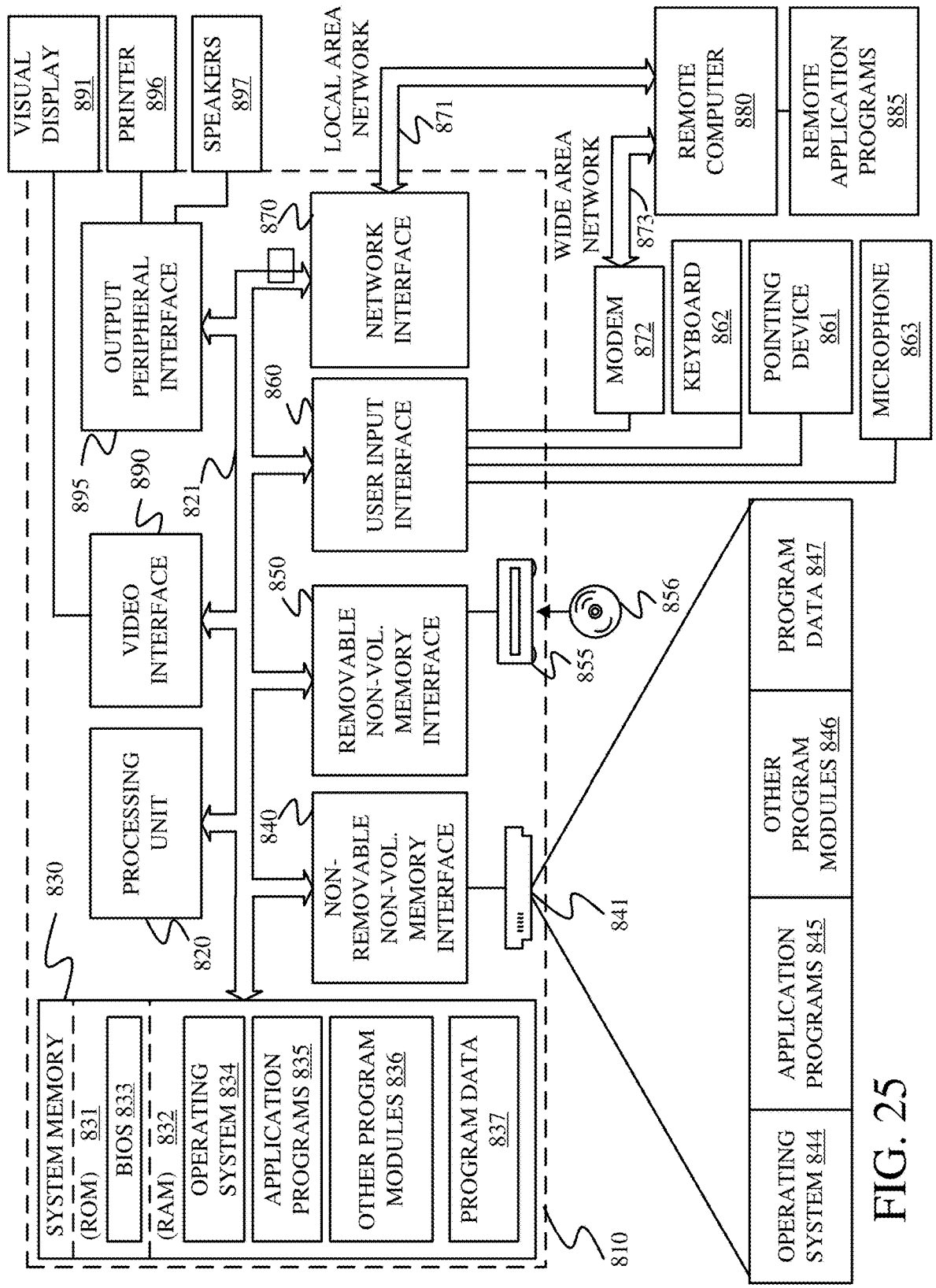
FIG. 25 is a block diagram of one example of a computing environment that can be used in the architectures set out in the previous FIGS.

FIG. 25 is one example of a computing environment in which architecture 100, or parts of it, (for example) can be deployed. With reference to FIG. 25, an example system for implementing some examples includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 25.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 25 illustrates operating system 834, application programs 835, other program modules 836, and program data 837.

The computer 810 may also include other removable/non-removable volatile/nonvolatile computer storage media. By way of example only, FIG. 25 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 25, provide storage of computer readable instructions, data structures, program modules and other data for the computer 810. In FIG. 25, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 25 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 25 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is an electronic mail (email) computer system, comprising:
  at least one processor; and
  a data store storing instructions which, when executed by the at least one processor, cause the at least one processor to perform steps, comprising:
    detecting a user social media input on an interface within an electronic mail (email) system;
    rendering a social media user interface within the email system, the social media user interface including a content input mechanism that is actuatable to enter content;
    receiving content through the content input mechanism;
    detecting actuation of a post input mechanism; and
    sending the content to the social media application for posting to a destination in the social media application.

Example 2 is the email computer system of any or all previous examples wherein rendering a social media user interface comprises:
  rendering the social media user interface with a destination selector mechanism; and
  detecting actuation of the destination selector mechanism identifying the destination in the social media application.

Example 3 is the email computer system of any or all previous examples wherein actuation of a destination selector comprises:
  detecting actuation of a community destination selector selecting, as the destination, a community in the social media application.

Example 4 is the email computer system of any or all previous examples wherein actuation of a destination selector comprises:
  detecting actuation of a personal feed destination selector selecting, as the destination, a personal feed in the social media application.

Example 5 is the email computer system of any or all previous examples wherein the computer executable instructions cause the one or more processors to perform steps further comprising:
  importing into the email system a plurality of social media components, each of the plurality of social media components being representative of a different social media user interface.

Example 6 is the email computer system of any or all previous examples wherein sending the content to the social media application comprises:
  interacting with an authentication system to authenticate the user to the social media application.

Example 7 is the email computer system of any or all previous examples wherein sending the content to the social media application comprises:
  making a call to an application programming interface exposed by the social media application to provide the content to the social media application.

Example 8 is the email computer system of any or all previous examples wherein the computer executable instructions cause the one or more processors to perform steps further comprising:
  receiving, at the email system, a response from the social media application; and
  displaying a user interface in the email system based on the response.

Example 9 is the email computer system of any or all previous examples wherein displaying the user interface in the email system based on the response, comprises:
  obtaining a link to the destination in the social media application; and
  displaying the link to the destination on the user interface in the email system.

Example 10 is the email computer system of any or all previous examples wherein the computer executable instructions cause the one or more processors to perform steps further comprising:
  detecting content input in an email system;
  perform content analysis on the content; and
  generating an output suggesting that the content be posted to the social media application, based on the analysis of the content.

Example 11 is a computer system, comprising:
  a social media post trigger detector that detects a user social media input on an interface within an electronic mail (email) system;
  a component rendering system that renders a social media user interface within the email system, the social media user interface including a content input mechanism that is actuatable to enter content;
  a user interface interaction detection system that receives content through the content input mechanism and that detects actuation of a post input mechanism; and
  a social media communication system that sends the content to the social media application for posting to a destination in the social media application.

Example 12 is the computer system of any or all previous examples wherein the component rendering system is configured to receive, at the email system, a response from the social media application and display a user interface in the email system based on the response.

Example 13 is the computer system of any or all previous examples and further comprising
  a social media link generator configured to obtain a link to the destination in the social media application and display the link to the destination on the user interface in the email system.

Example 14 is a computer implemented method, comprising:
  detecting a user social media input on an interface within an electronic mail (email) system;
  rendering a social media user interface within the email system, the social media user interface including a content input mechanism that is actuatable to enter content;
  receiving content through the content input mechanism;
  detecting actuation of a post input mechanism; and
  sending the content to the social media application for posting to a destination in the social media application.

Example 15 is the computer implemented method of any or all previous examples wherein rendering a social media user interface comprises:
  rendering the social media user interface with a destination selector mechanism; and
  detecting actuation of the destination selector mechanism identifying the destination in the social media application.

Example 16 is the computer implemented method of any or all previous examples wherein actuation of a destination selector comprises:
  detecting actuation of a community destination selector selecting, as the destination, a community in the social media application.

Example 17 is the computer implemented method of any or all previous examples wherein actuation of a destination selector comprises:
  detecting actuation of a personal feed destination selector selecting, as the destination, a personal feed in the social media application.

Example 18 is the computer implemented method of any or all previous examples and further comprising:
  importing into the email system a plurality of social media components, each of the plurality of social media components being representative of a different social media user interface.

Example 19 is the computer implemented method of any or all previous examples and further comprising:
  receiving, at the email system, a response from the social media application; and
  displaying a user interface in the email system based on the response.

Example 20 is the computer implemented method of any or all previous examples wherein displaying the user interface in the email system based on the response, comprises:
  obtaining a link to the destination in the social media application; and
  displaying the link to the destination on the user interface in the email system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic mail (email) computer system, comprising:
  at least one processor; and
  a data store storing instructions which, when executed by the at least one processor, cause the email computer system to:
    detect a user social media input on an interface within an electronic mail (email) system;
    render a social media user interface with a social media component within the email system, the social media user interface including a content input mechanism that is actuatable to enter content;
  receive the content through the content input mechanism;
  perform content analysis on the content; and
  generate an output suggesting that the content be posted to the social media application based on the content analysis on the content;
  render a destination selector mechanism on the social media user interface within the email system;
  receive a user input through the destination selector mechanism that selects a destination in the social media application;
  detect actuation of a post input mechanism; and
  send, to the social media application, the content to post the content to the selected destination in the social media application.

2. The email computer system of claim 1 wherein the instructions, when executed by the at least one processor, cause the email computer system to:
  receive an indication of a plurality of destinations in the social media application; and
  render, in the social media user interface, a plurality of destination display elements representing the plurality of destinations.

3. The email computer system of claim 1, wherein the instructions, when executed by the at least one processor, cause the email computer system to:
  detect actuation of a community destination selector selecting, as the destination, a community in the social media application.

4. The email computer system of claim 1, wherein the instructions, when executed by the at least one processor, cause the email computer system to:
  detect actuation of a personal feed destination selector selecting, as the destination, a personal feed in the social media application.

5. The email computer system of claim 1, wherein the instructions, when executed by the at least one processor, cause the email computer system to:
  import into the email system a plurality of social media components, each of the plurality of social media components being representative of a different social media user interface.

6. The email computer system of claim 1, wherein the instructions, when executed by the at least one processor, cause the email computer system to:
  interact with an authentication system to authenticate the user to the social media application.

7. The email computer system of claim 1 wherein the instructions, when executed by the at least one processor, cause the email computer system to:
  make a call to an application programming interface exposed by the social media application to provide the content to the social media application.

8. The email computer system of claim 7 wherein the instructions cause the email computer system to:
  receive, at a social media component in the email system, a response from the social media application; and
  display a user interface using the social media component in the email system based on the response.

9. The email computer system of claim 8 wherein the instructions, when executed by the at least one processor, cause the email computer system to:
  obtain a link to the destination in the social media application; and
  display the link to the destination on the user interface in the email system.

10. The email computer system of claim 1, wherein the content analysis comprises a subject matter analysis that determines a subject matter of the content, and the output suggesting that the content be posted to the social media application is generated based on the subject matter of the content.

11. The email computer system of claim 10, wherein the instructions, when executed by the at least one processor, cause the email computer system to:
  identify a subject matter area in the social media application; and
  generate the output suggesting that the content be posted to the social media application based on the subject matter area in the social media application.

12. The email computer system of claim 10, wherein the instructions, when executed by the at least one processor, cause the email computer system to:
  generate the output suggesting that the content be posted to the social media application based on the subject matter of the content matching the subject matter area in the social media application.

13. A computer system, comprising:
a social media post trigger detector configured to detect a user social media input on an interface within an electronic mail (email) system;
a component rendering system configured to render a social media user interface within the email system, the social media user interface including a content input mechanism that is actuatable to enter content;
a user interface interaction detection system configured to receive content through the content input mechanism and configured to detect actuation of a post input mechanism; and
a social media communication system configured to send the content to the social media application for posting to a destination in the social media application; and
a social media link generator configured to:
obtain a link to the destination in the social media application;
display the link to the destination on the social media user interface within the email system; and
in response to actuation of the link on the social media user interface within the email system, navigate to the destination in the social media application where the content was posted.

14. The computer system of claim 13 wherein the component rendering system is configured to receive, at the email system, a response from the social media application and display a user interface in the email system based on the response.

15. The computer system of claim 13, wherein
the component rendering system is configured to:
receive an indication of a plurality of destinations in the social media application; and
render, in the social media user interface, a plurality of destination display elements representing the plurality of destinations;
the user interface interaction detection system is configured to:
based on a destination selection user input, select the destination from the plurality of destinations; and
the social media communication system is configured to send the content to the social media application for posting to the selected destination in the social media application.

16. A computer implemented method comprising:
detecting a user social media input on an electronic mail (email) user interface display in an email system;
importing, into the email system, a plurality of social media components from a social media application, each of the plurality of social media components being representative of a different social media user interface from the social media application;
rendering, in the email user interface display, a social media user interface component based on the plurality of social media components imported from the social media application, the social media user interface component including:
a content input mechanism that is actuatable to enter content; and
a destination selector mechanism;
receiving the content through the content input mechanism;
detecting actuation of the destination selector mechanism;
selecting a destination in the social media application based on the detected actuation of the destination selector mechanism;
detecting actuation of a post input mechanism; and
sending, to the social media application, the content with an indication of the selected destination in the social media application.

17. The computer implemented method of claim 16 wherein actuation of a destination selector comprises:
detecting actuation of a community destination selector selecting, as the destination, a community in the social media application.

18. The computer implemented method of claim 16 wherein actuation of a destination selector comprises:
detecting actuation of a personal feed destination selector selecting, as the destination, a personal feed in the social media application.

19. The computer implemented method of claim 16 and further comprising:
receiving, at a social media component in the email system, a response from the social media application; and
displaying a user interface using the social media component in the email system based on the response.

20. The computer implemented method of claim 19 wherein displaying the user interface in the email system based on the response, comprises:
obtaining a link to the destination in the social media application; and
displaying the link to the destination on the user interface in the email system.

* * * * *